United States Patent
Lerner et al.

(10) Patent No.: US 11,542,904 B2
(45) Date of Patent: Jan. 3, 2023

(54) METHODS AND SYSTEMS FOR START/STOP

(71) Applicant: Ford Global Technologies, LLC, Dearborn, MI (US)

(72) Inventors: Jeremy Lerner, Southfield, MI (US); Jae Hyung Lim, Canton, MI (US); Taylor Hawley, Oak Park, MI (US); Mohammad Abouali, Canton, MI (US); Xingping Chen, Troy, MI (US); Scott Huggins, Novi, MI (US); Navid Tafaghodi Khajavi, Troy, MI (US); Ryan Jones, Canton, MI (US); Nahid Pervez, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/222,156

(22) Filed: Apr. 5, 2021

(65) Prior Publication Data
US 2022/0314995 A1    Oct. 6, 2022

(51) Int. Cl.
| F02N 11/08 | (2006.01) |
| B60W 30/18 | (2012.01) |
| B60W 50/14 | (2020.01) |
| H04W 4/021 | (2018.01) |
| H04W 4/46 | (2018.01) |

(52) U.S. Cl.
CPC ... *F02N 11/0822* (2013.01); *B60W 30/18018* (2013.01); *B60W 50/14* (2013.01); *F02N 11/084* (2013.01); *F02N 11/0814* (2013.01); *F02N 11/0833* (2013.01); *F02N 11/0837* (2013.01); *H04W 4/021* (2013.01); *H04W 4/46* (2018.02); *B60W 2050/146* (2013.01); *F02N 11/0829* (2013.01)

(58) Field of Classification Search
None
See application file for complete search history.

(56) References Cited

U.S. PATENT DOCUMENTS

| 6,460,500 | B1 * | 10/2002 | Ooyama | F02N 7/00 123/179.31 |
| 7,079,940 | B2 | 7/2006 | Scholt et al. | |
| 8,031,062 | B2 | 10/2011 | Smith | |
| 8,296,030 | B2 | 10/2012 | Luo et al. | |
| 8,396,618 | B2 * | 3/2013 | Cikanek | B60L 3/106 180/65.265 |
| 8,401,733 | B2 | 3/2013 | Weslati et al. | |
| 8,538,620 | B2 * | 9/2013 | Nakamura | B60L 50/51 701/22 |
| 8,594,912 | B2 | 11/2013 | Weaver | |

(Continued)

FOREIGN PATENT DOCUMENTS

| CA | 3082666 A1 * | 12/2020 | B60L 50/15 |
| CN | 103635345 A * | 3/2014 | B44D 3/18 |

(Continued)

*Primary Examiner* — Kevin R Steckbauer
(74) *Attorney, Agent, or Firm* — Vincent Mastrogiacomo; McCoy Russell LLP

(57) ABSTRACT

Methods and systems are provided for a start/stop feature. In one example, a method includes adjusting start/stop conditions in response to a vehicle operator customizing start/stop conditions. The vehicle operator customizes start/stop conditions for a plurality of different driving conditions.

14 Claims, 9 Drawing Sheets

(56) References Cited

U.S. PATENT DOCUMENTS

| | | | | |
|---|---|---|---|---|
| 8,919,314 | B2* | 12/2014 | Saito | F02N 11/0822 |
| | | | | 123/196 S |
| 8,972,152 | B2* | 3/2015 | Boesch | F02N 11/0837 |
| | | | | 701/112 |
| 9,279,405 | B2 | 3/2016 | Leatherland et al. | |
| 9,410,524 | B2* | 8/2016 | Schweiger | F02N 11/0818 |
| 9,902,400 | B2* | 2/2018 | Yonan | F02N 11/0814 |
| 10,118,602 | B2 | 11/2018 | Fischer | |
| 10,253,714 | B2* | 4/2019 | Elwart | F02N 11/0837 |
| 10,322,042 | B2* | 6/2019 | Khafagy | A61G 3/062 |
| 10,435,007 | B2 | 10/2019 | Follen et al. | |
| 10,823,128 | B1* | 11/2020 | Kessels | B60L 58/13 |
| 11,248,549 | B2* | 2/2022 | Moro | F02D 41/042 |
| 2005/0143877 | A1* | 6/2005 | Cikanek | B60W 20/00 |
| | | | | 701/22 |
| 2012/0080001 | A1* | 4/2012 | Saito | F02N 11/0822 |
| | | | | 123/179.4 |
| 2013/0090799 | A1* | 4/2013 | Nakamura | B60L 50/51 |
| | | | | 701/22 |
| 2013/0110374 | A1* | 5/2013 | Boesch | F02N 11/0837 |
| | | | | 701/102 |
| 2013/0110376 | A1* | 5/2013 | Surnilla | F02D 41/042 |
| | | | | 180/65.28 |
| 2014/0343830 | A1* | 11/2014 | Elwart | F02N 11/0837 |
| | | | | 701/112 |
| 2015/0322911 | A1* | 11/2015 | Schweiger | F02N 11/0837 |
| | | | | 701/112 |
| 2017/0144666 | A1* | 5/2017 | Yonan | F02N 11/0803 |
| 2017/0298849 | A1* | 10/2017 | Be | F02D 41/021 |
| 2018/0344545 | A1* | 12/2018 | Khafagy | B66F 9/07572 |
| 2020/0332732 | A1* | 10/2020 | Moro | F02D 41/065 |
| 2021/0140400 | A1* | 5/2021 | Paisley | F02D 41/0225 |
| 2022/0055611 | A1* | 2/2022 | Miyazato | B60W 20/40 |

FOREIGN PATENT DOCUMENTS

| | | | | |
|---|---|---|---|---|
| CN | 105089823 A | * | 11/2015 | ......... F02N 11/0818 |
| CN | 105980693 A | * | 9/2016 | ............ F02D 17/00 |
| CN | 103635345 B | * | 12/2016 | .............. B44D 3/18 |
| CN | 106740825 A | * | 5/2017 | ......... B60W 30/182 |
| CN | 107298063 A | * | 10/2017 | ............. B60J 1/002 |
| CN | 108973824 A | * | 12/2018 | ............ A61G 3/062 |
| CN | 110194143 A | * | 9/2019 | ......... F02N 11/0814 |
| CN | 110884491 A | * | 3/2020 | ............ B60T 17/22 |
| CN | 111828182 A | * | 10/2020 | ............ F02D 17/04 |
| DE | 102011004046 A1 | * | 9/2011 | ......... F02N 11/0818 |
| DE | 102011053972 A1 | * | 6/2012 | ......... F02N 11/0822 |
| DE | 102011107005 A1 | * | 1/2013 | .............. B44D 3/18 |
| DE | 102014209035 A1 | * | 11/2014 | ............ F02D 41/24 |
| DE | 102014208919 A1 | * | 11/2015 | ......... F02N 11/0818 |
| DE | 102016121389 A1 | * | 5/2017 | ......... B60W 30/182 |
| DE | 102017107770 A1 | * | 10/2017 | ............. B60J 1/002 |
| DE | 102017200602 A1 | * | 7/2018 | ......... F02N 11/0822 |
| DE | 102019110504 A1 | * | 10/2019 | ............ B60W 10/06 |
| DE | 102011053972 B4 | * | 1/2022 | ......... F02N 11/0822 |
| EP | 1052399 A2 | * | 11/2000 | ......... F02N 11/0833 |
| EP | 3056717 A1 | * | 8/2016 | ............ F02D 17/00 |
| EP | 3751698 A1 | * | 12/2020 | ............ B60L 50/15 |
| FR | 2995835 A1 | * | 3/2014 | ...... B60W 30/18018 |
| GB | 2551424 A | * | 12/2017 | ............. B60J 1/002 |
| JP | 2000320365 A | * | 11/2000 | ......... F02N 11/0833 |
| JP | 2004116389 A | * | 4/2004 | ......... F02N 11/0833 |
| JP | 2011196339 A | * | 10/2011 | ......... F02N 11/0818 |
| JP | 5540804 B2 | * | 7/2014 | ......... F02N 11/0818 |
| JP | 2015075080 A | * | 4/2015 | ............ F02D 17/00 |
| JP | 6681447 B2 | * | 4/2020 | ............ B60T 17/22 |
| JP | 2020176585 A | * | 10/2020 | ............ F02D 17/04 |
| JP | 6936275 B2 | * | 9/2021 | ............ F02D 17/04 |
| WO | WO-2014049264 A1 | * | 4/2014 | ...... B60W 30/18018 |
| WO | WO-2015053065 A1 | * | 4/2015 | ............ F02D 17/00 |

\* cited by examiner

METHODS AND SYSTEMS FOR START/STOP

FIELD

The present description relates generally to adjusting start/stop in response to conditions.

BACKGROUND/SUMMARY

Reduction of tailpipe emissions may be a shared goal among manufacturers in the automotive industry. As the standards for emissions continue to increase, technologies may continually evolve to meet the standards. Tailpipe emissions based on current standards may need to be reduced to meet future regulations. There are many techniques used in modern vehicles to reduce tailpipe emissions.

One example technique includes start/stop technology. In one example, start/stop technology may reduce an amount of time an engine combusts during stop events in response to an eligible stop event. During some stop events, an engine stop may not be desired by a vehicle operator. Thus, execution of start/stop during all eligible stop events may be undesired, leading to customer dissatisfaction.

One example approach for optimizing start/stop conditions is shown by Weaver in U.S. Pat. No. 8,594,912. Therein, start/stop locations are predetermined via a GPS device of a vehicle. The locations may be based on a grade of the road and a stop duration may be based on a distance between stops in relation to a speed traveled. By doing this, start/stop may be enhanced.

However, the inventors herein have recognized potential issues with such systems. As one example, basing start/stops on predetermined locations may circumvent undesirable engine stop under certain conditions, control of engine stop execution at a discretion of an operator is still not enabled. Thus, customer dissatisfaction is not mitigated.

In one example, the issues described above may be addressed by a method for adjusting start/stop parameters in response to vehicle operator inputs via a human-machine interface. In this way, the vehicle operator may customize start/stop parameters.

As one example, the vehicle operator may customize start/stop parameters based on a geofenced area, weather, time of day, traffic conditions, and the like. Additionally or alternatively, customizations provided by other vehicle operators within a similar geofenced area may be used if customization from the vehicle operator is not provided. The other vehicle operators may be selected based on shared similarities including driver behavior, vehicle make/model, gender, age, and the like. In this way, start/stop customizations may be retrieved from a network in communication with a plurality of vehicles.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 illustrates a method for adjusting start/stop based on a garage door open request or a vehicle being at a drive-through.

DETAILED DESCRIPTION

Figure 1:
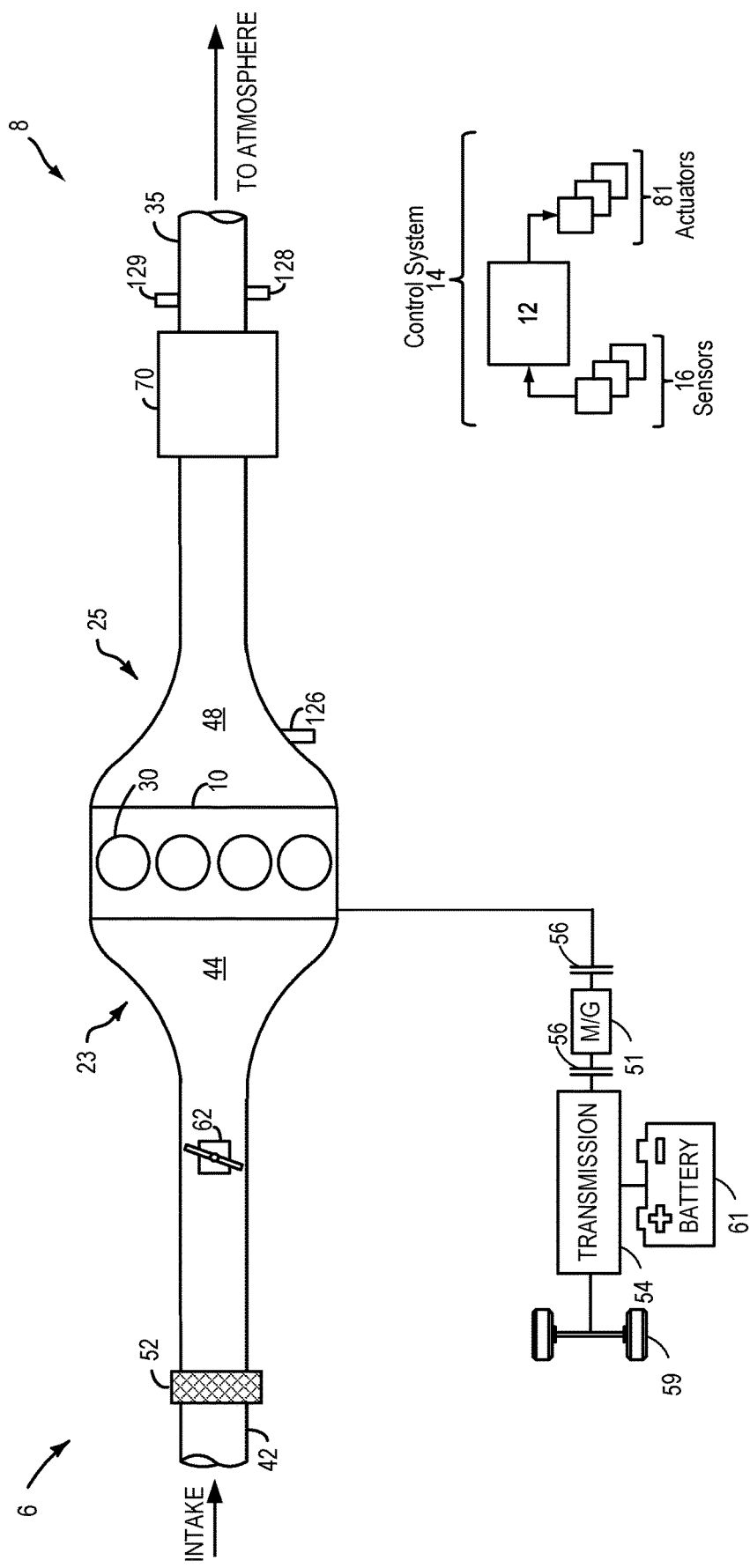
FIG. 1 illustrates a schematic of an engine included in a hybrid vehicle.
Figure 2:
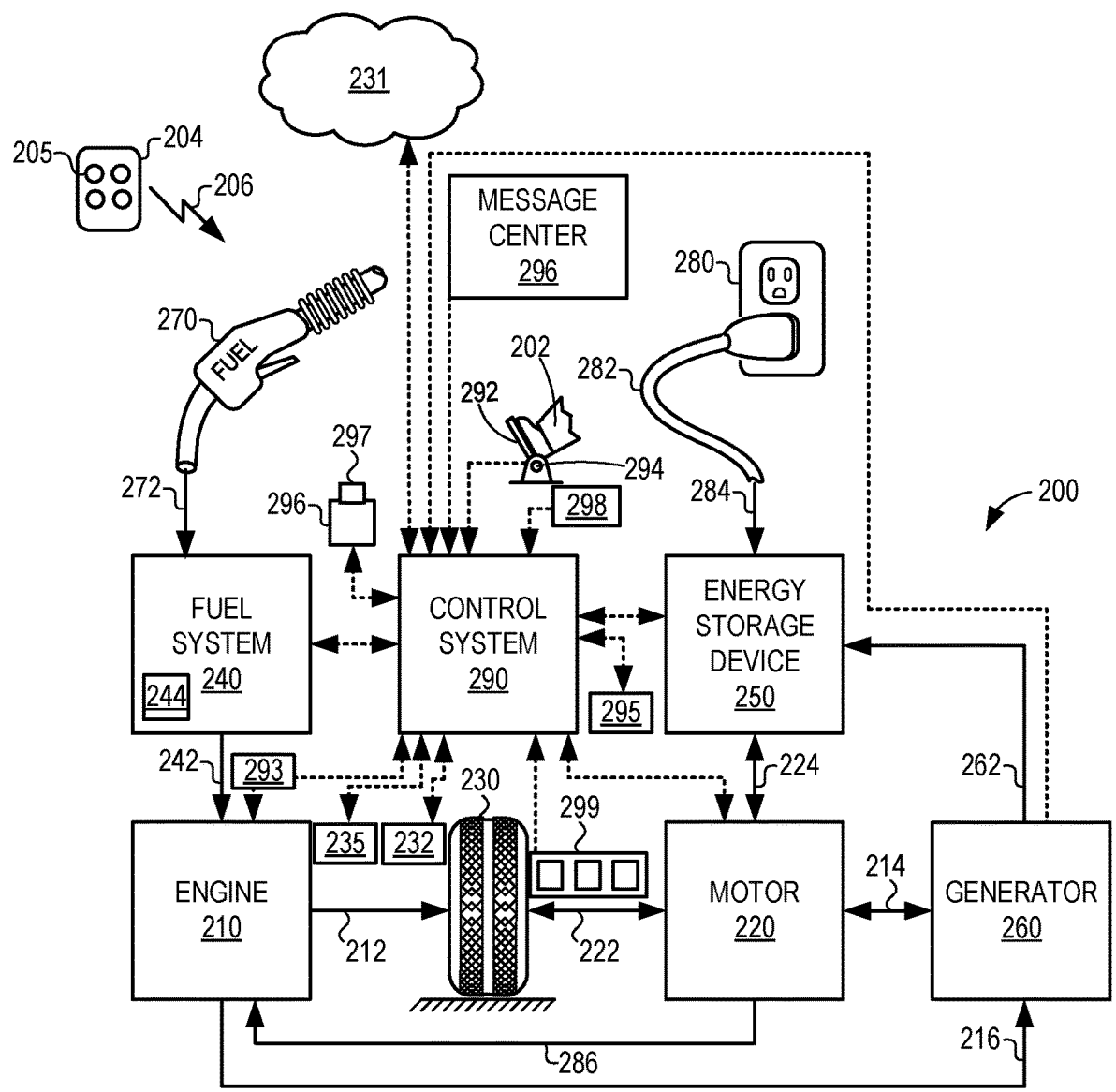
FIG. 2 schematically shows an example vehicle propulsion system.
Figure 3:
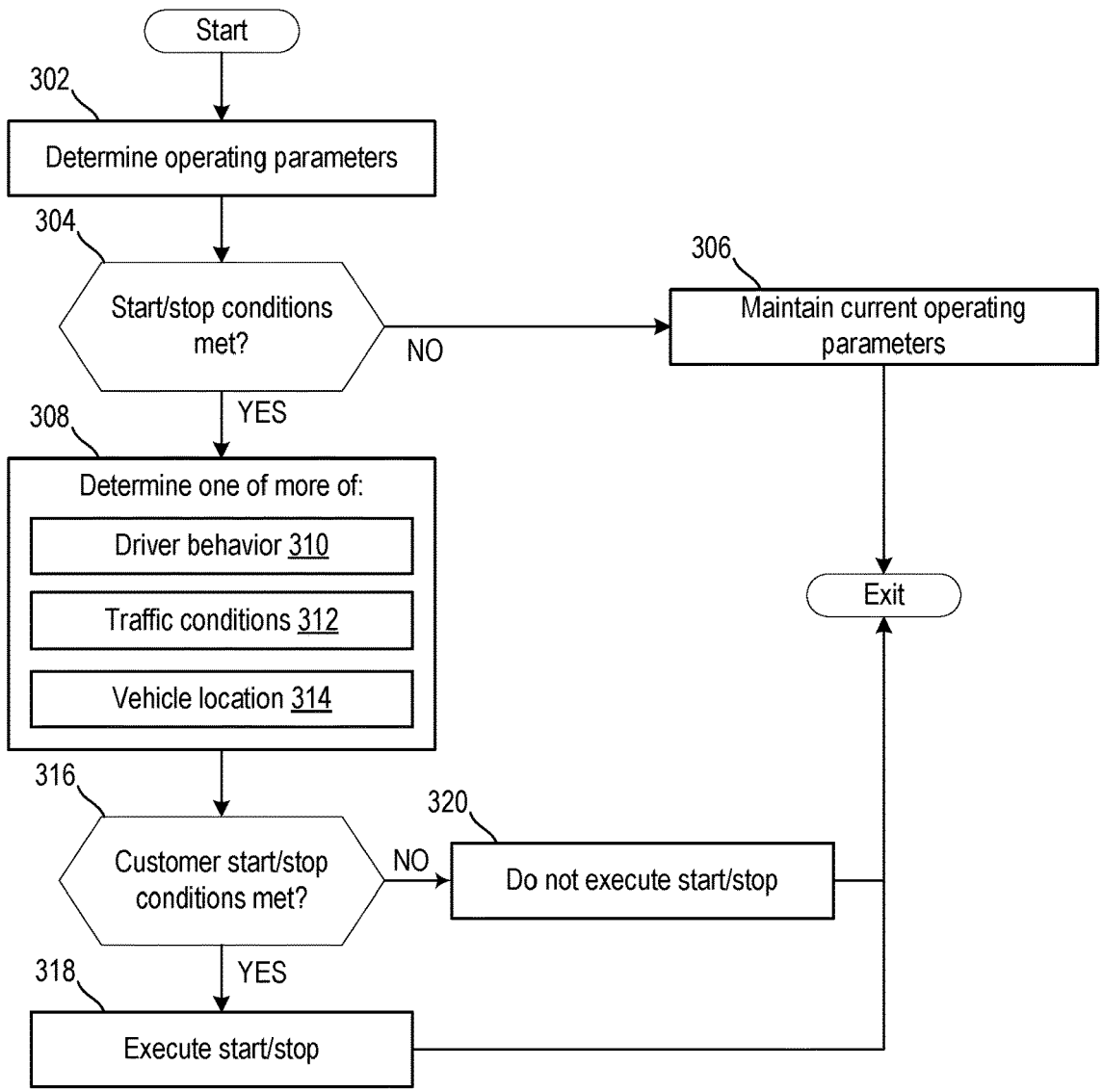
FIG. 3 illustrates a method for a start/stop routine.
Figure 4:
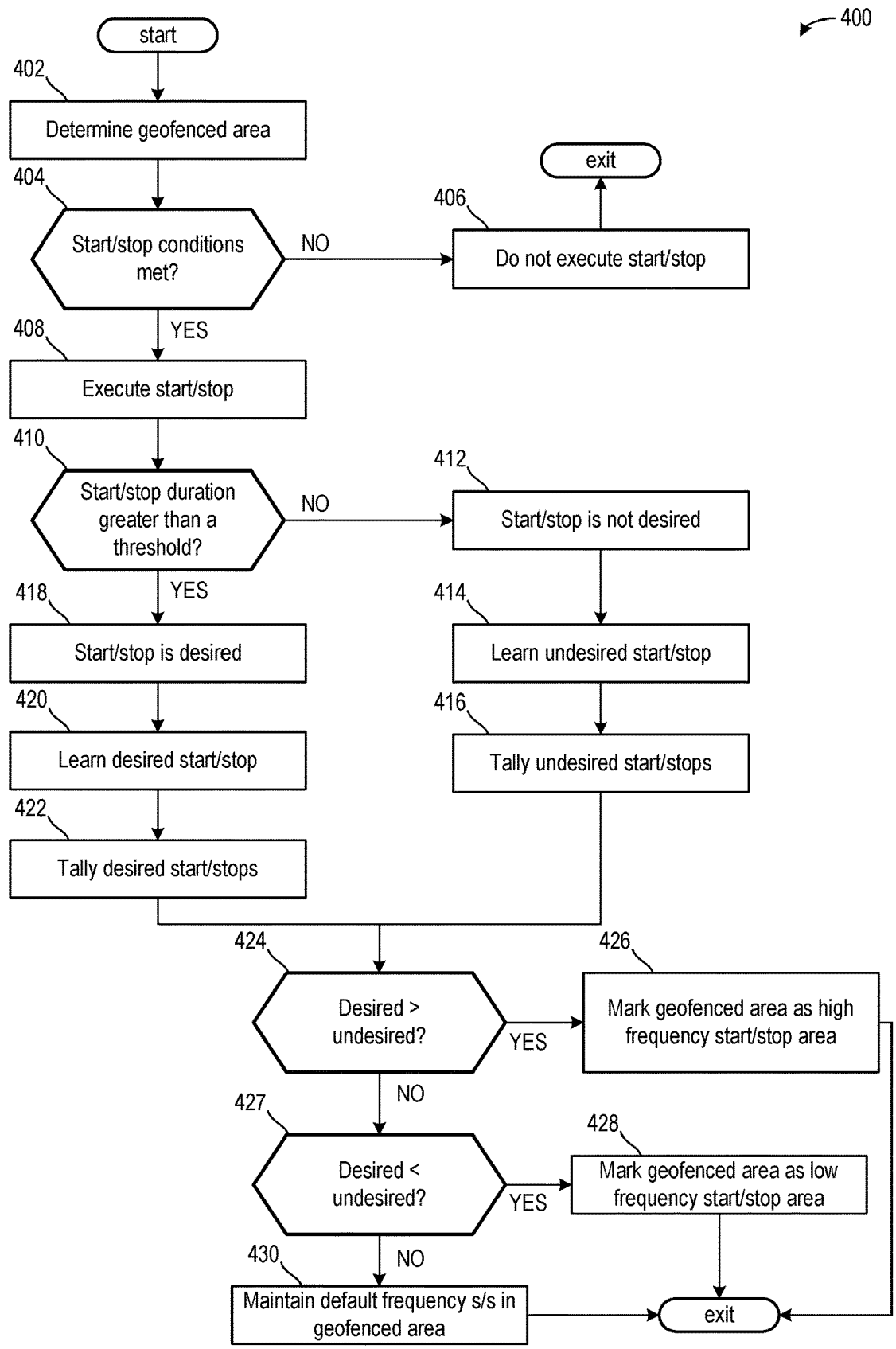
FIG. 4 illustrates a method for executing a start/stop routine based on a geofenced area.
Figure 5:
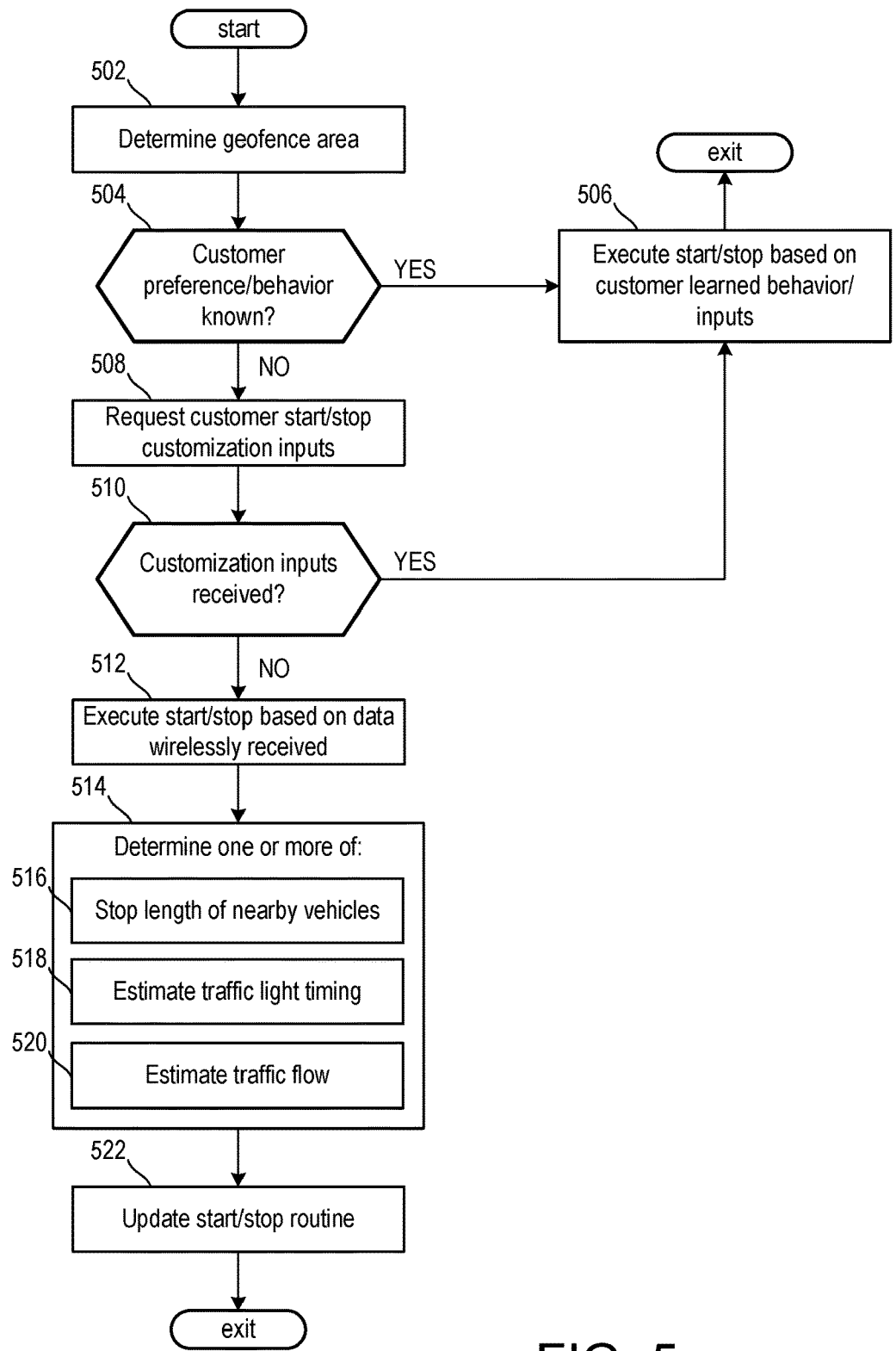
FIG. 5 illustrates a method for executing a start/stop routine based on vehicle operator customized start/stop parameters.
Figure 6:
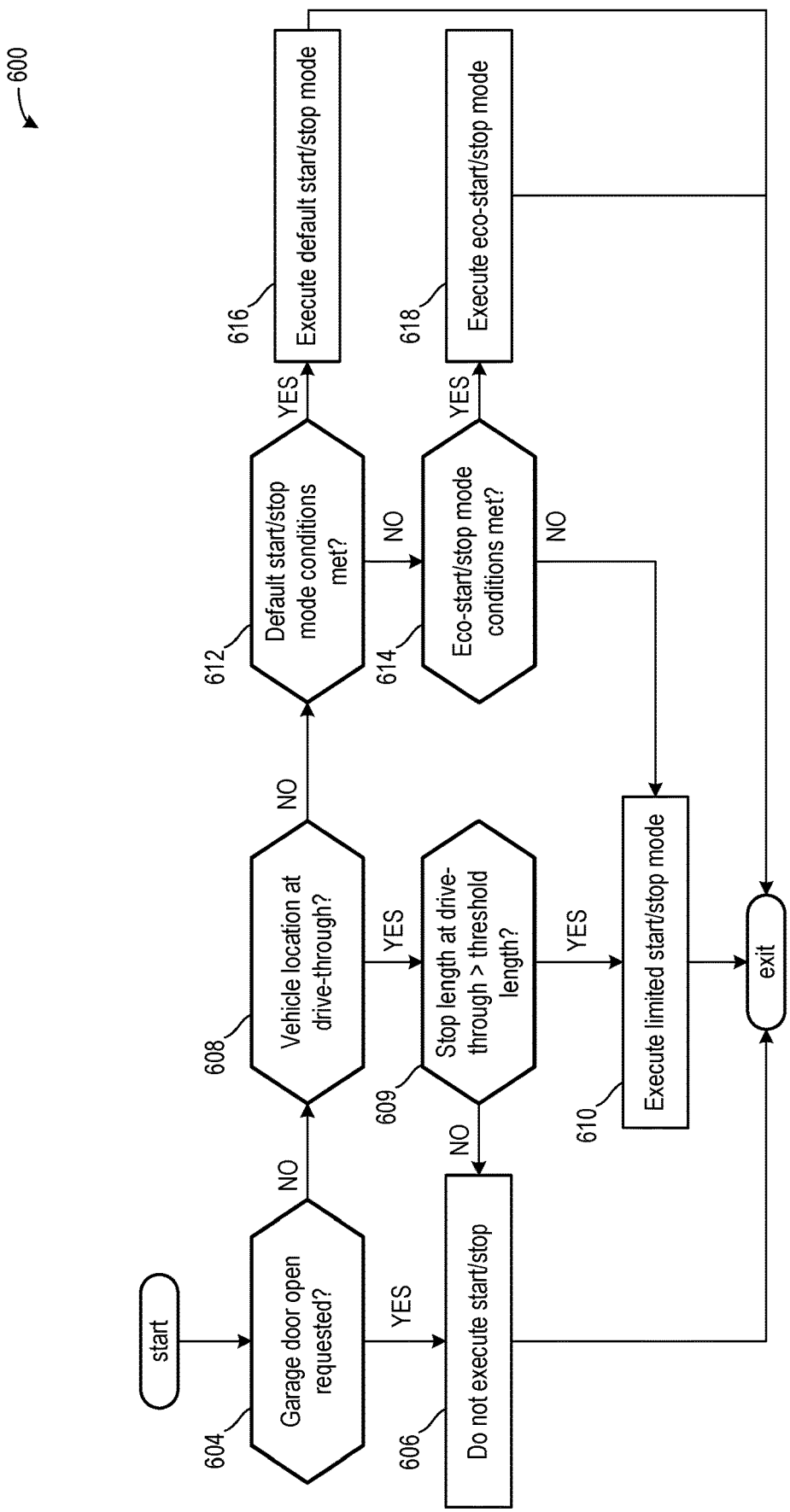
Figure 7:
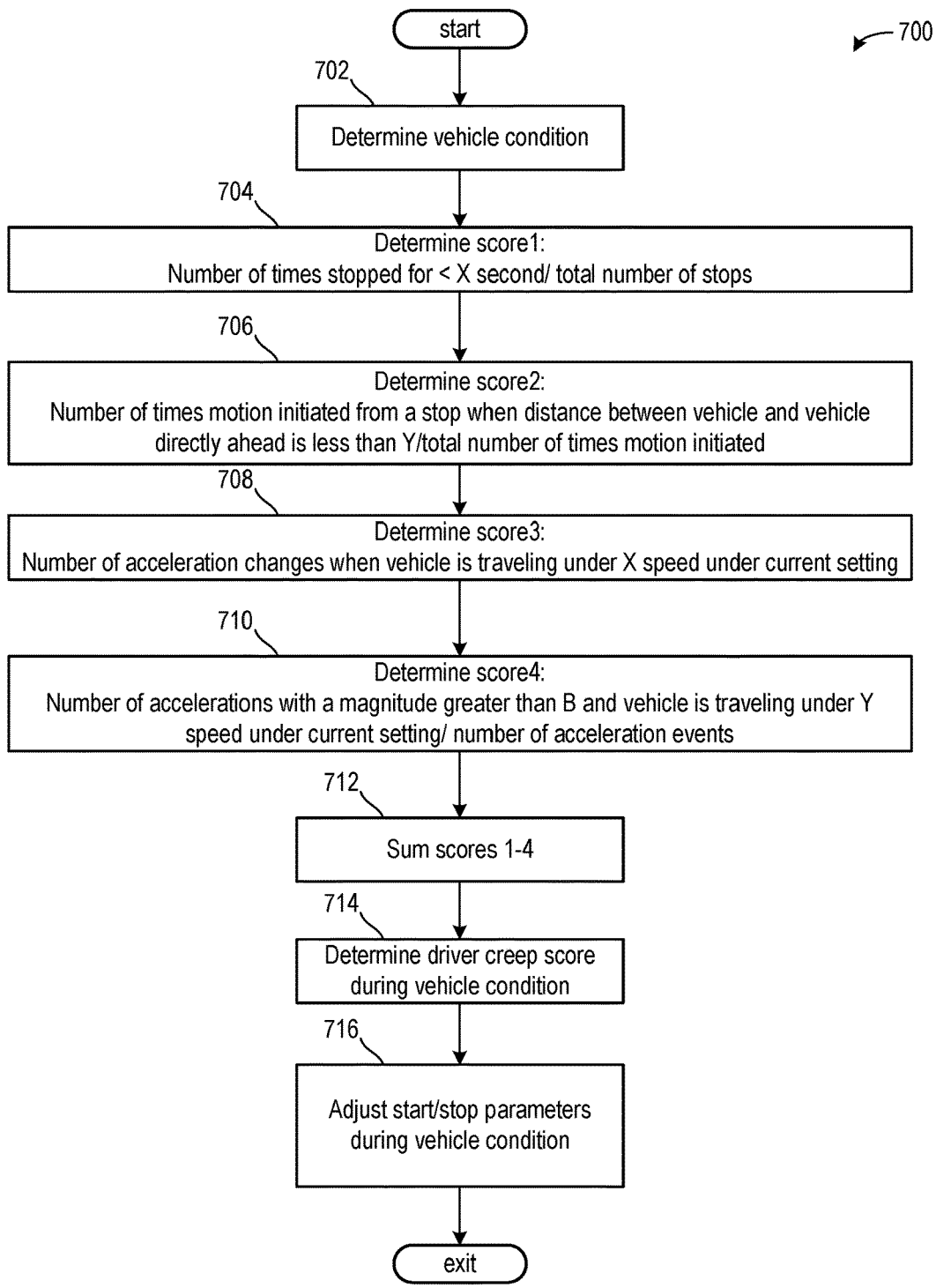
FIG. 7 illustrates a method for determining a vehicle operator creep score.
Figure 8:
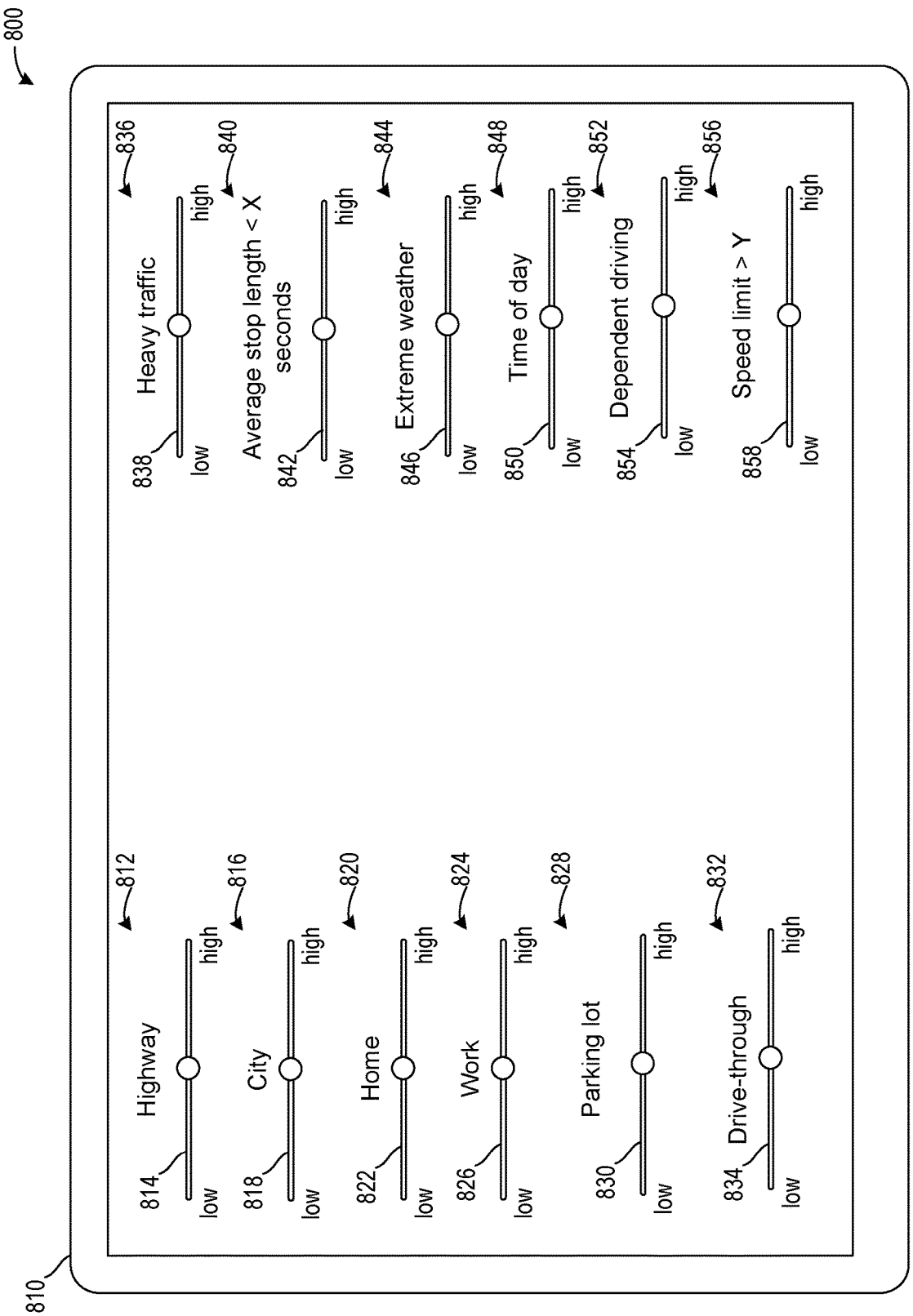
FIG. 8 illustrates an example display for a vehicle operator to customize start/stop conditions.
Figure 9:
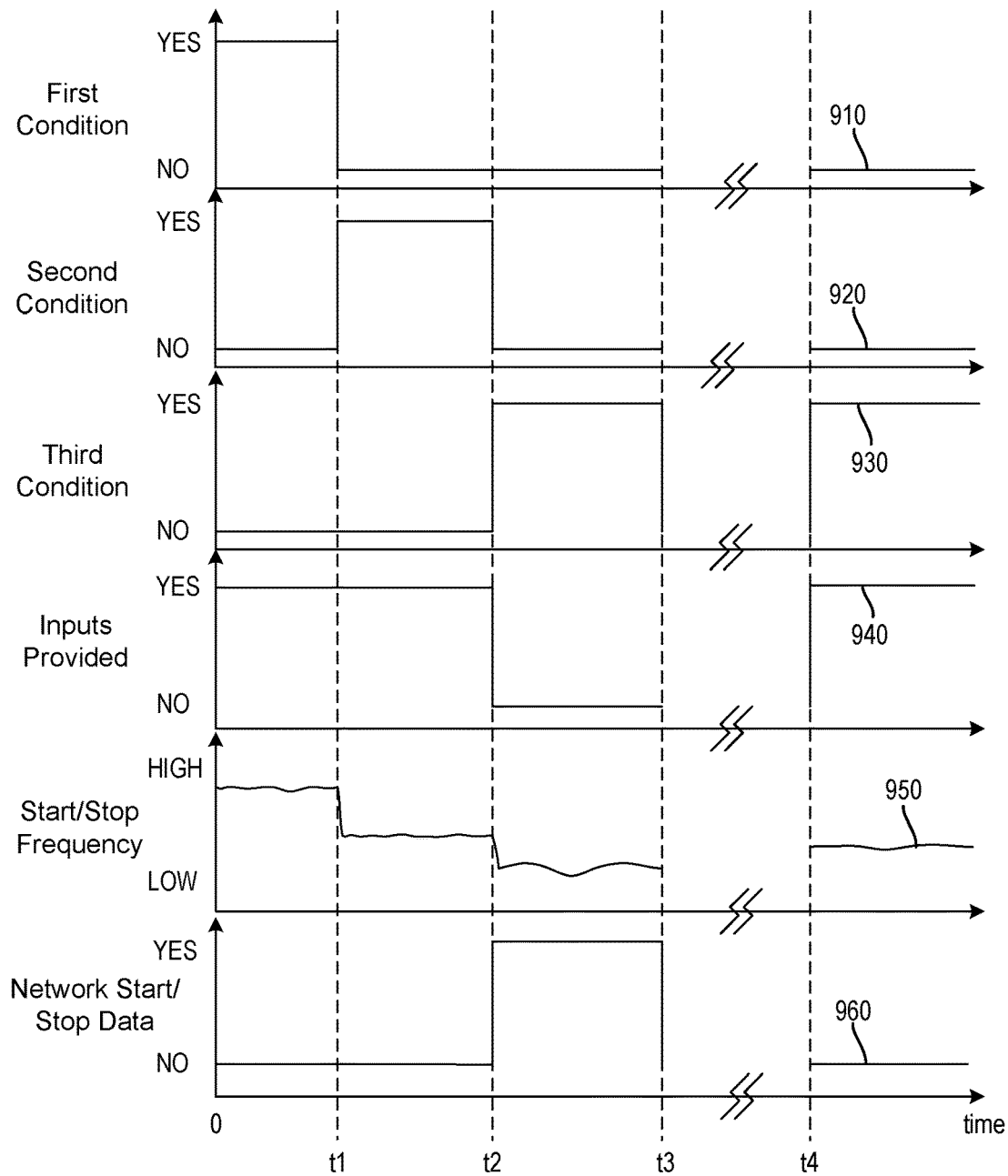
FIG. 9 graphically shows start/stop execution frequency changing in response to conditions.

The following description relates to systems and methods for start/stop. In one example, the start/stop conditions may be adjusted in response to a vehicle operator customization and/or a customization of a different vehicle operator with similar characteristics to the vehicle operator. The start/stop may be executed in a hybrid vehicle as illustrated in FIGS. 1 and 2. A high-level flow chart illustrating a method for executing a start/stop is shown in FIG. 3. A method for updating start/stop parameters based on a start/stop duration is shown in FIG. 4. A method for customizing start/stop parameters based on a vehicle operator inputting one or more desired parameters is shown in FIG. 5. A method for adjusting start/stop parameters in response to a drive-through or garage door is shown in FIG. 6. A method for determining a creep score of a vehicle operator for adjusting start/stop parameters is shown in FIG. 7. FIG. 8 illustrates an example display for a vehicle operator to customize start/stop conditions, and an example execution is shown in FIG. 9.

FIG. 1 shows a schematic depiction of a hybrid vehicle system 6 that can derive propulsion power from engine system 8 and/or an on-board energy storage device. An energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6. As another example, the actuators may include the throttle 62.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine, or an electric vehicle with only electric machine(s). In the example shown, vehicle 6 includes engine 10 and an electric machine 51. Electric machine 51 may be a motor or a motor/generator. A crankshaft of engine 10 and electric machine 51 may be connected via a transmission 54 to vehicle wheels 59 when one or more clutches 56 are engaged. In the depicted example, a first clutch 56 is provided between a crankshaft and the electric machine 51, and a second clutch 56 is provided between electric machine 51 and transmission 54. Controller 12 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

FIG. 2 illustrates an example vehicle propulsion system 200 which may be used similarly to hybrid vehicle system 6 of FIG. 1. Vehicle propulsion system 200 includes a fuel burning engine 210 and a motor 220. As a non-limiting example, engine 210 comprises an internal combustion engine and motor 220 comprises an electric motor. Engine 210 may be used substantially similarly to engine 10 of FIG. 1 and motor 220 may be used similarly to electric machine 51 of FIG. 1. Motor 220 may be configured to utilize or consume a different energy source than engine 210. For example, engine 210 may consume a liquid fuel (e.g., gasoline) to produce an engine output while motor 220 may consume electrical energy to produce a motor output. As such, a vehicle with propulsion system 200 may be referred to as a hybrid electric vehicle (HEV).

Vehicle propulsion system 200 may utilize a variety of different operational modes depending on operating conditions encountered by the vehicle propulsion system. Some of these modes may enable engine 210 to be maintained in an off state (i.e., set to a deactivated state) where combustion of fuel at the engine is discontinued. For example, under select operating conditions, motor 220 may propel the vehicle via drive wheel 230 as indicated by arrow 222 while engine 210 is deactivated, which may herein be referred to as an electric-only operation.

In another example, the engine may be equipped with a start/stop (S/S) feature 293, wherein the engine 210 may be automatically shut down during times when the vehicle is not moving, or when the vehicle speed is below a threshold speed, when engine speed is below a threshold engine speed, etc. Control system 290 may be connected to engine 210 and S/S feature 293, for performing the start-stop functions. Advantages to the S/S functionality may include an improvement in fuel economy over other vehicles that do not employ such technology. During the start/stop the vehicle may be propelled via its momentum and not by the engine 210 or the motor 220.

Herein, "automatically" executing various vehicle features, such as S/S, refers to execution of the various features without vehicle operator input. That is to say, the vehicle operator does not directly signal or request the S/S or other automatic features to be executed. As such, automatic features are automatically executed in a response to current operating conditions and may not be directly signaled by the operator.

During other operating conditions, engine 210 may be set to a deactivated state (as described above) while motor 220 may be operated to charge energy storage device 250. For example, motor 220 may receive wheel torque from drive wheel 230 as indicated by arrow 222 where the motor may convert the kinetic energy of the vehicle to electrical energy for storage at energy storage device 250 as indicated by arrow 224. This operation may be referred to as regenerative braking of the vehicle. Thus, motor 220 can provide a generator function in some examples. However, in other examples, generator 260 may instead receive wheel torque from drive wheel 230, where the generator may convert the kinetic energy of the vehicle to electrical energy for storage at energy storage device 250 as indicated by arrow 262. In some examples, the engine 210 may deactivate during regenerative braking and traction at the drive wheel 230 may be negative, such that the motor 220 may spin in reverse and recharge the energy storage device 250. Thus, regenerative braking may be distinguished from an electric-only operation, where the motor 220 may provide positive traction at the drive wheel 230, thereby decreasing a SOC of the energy storage device 250 while the engine 210 is deactivated.

During still other operating conditions, engine 210 may be operated by combusting fuel received from fuel system 240 as indicated by arrow 242. For example, engine 210 may be operated to propel the vehicle via drive wheel 230 as indicated by arrow 212 while motor 220 is deactivated, such as during a charge-sustaining operation. During other operating conditions, both engine 210 and motor 220 may each be operated to propel the vehicle via drive wheel 230 as indicated by arrows 212 and 222, respectively. A configuration where both the engine and the motor may selectively propel the vehicle may be referred to as a parallel type vehicle propulsion system or a hybrid propulsion. Note that in some examples, motor 220 may propel the vehicle via a first set of drive wheels and engine 210 may propel the vehicle via a second set of drive wheels.

In other examples, vehicle propulsion system 200 may be configured as a series type vehicle propulsion system, whereby the engine does not directly propel the drive wheels. Rather, engine 210 may be operated by power motor 220, which may in turn propel the vehicle via drive wheel 230 as indicated by arrow 222. For example, during select operating conditions, engine 210 may drive generator 260 as indicated by arrow 216, which may in turn supply electrical energy to one or more of motor 220 as indicated by arrow 214 or energy storage device 250 as indicated by arrow 262. As another example, engine 210 may be operated to drive motor 220 which may in turn provide a generator function to convert the engine output to electrical energy, where the electrical energy may be stored at energy storage device 250 for later use by the motor.

In still other examples, which will be discussed in further detail below, motor 220 may be configured to rotate engine unfueled in a forward (e.g. default orientation) or reverse orientation, using energy provided via energy storage device 250, exemplified by arrow 286.

Fuel system 240 may include one or more fuel storage tanks 244 for storing fuel on-board the vehicle. For example, fuel tank 244 may store one or more liquid fuels, including but not limited to: gasoline, diesel, and alcohol fuels. In some examples, the fuel may be stored on-board the vehicle as a blend of two or more different fuels. For example, fuel tank 244 may be configured to store a blend of diesel and biodiesel, gasoline and ethanol (e.g., E10, E85, etc.) or a blend of gasoline and methanol (e.g., M10, M85, etc.), whereby these fuels or fuel blends may be delivered to engine 210 as indicated by arrow 242. Still other suitable fuels or fuel blends may be supplied to engine 210, where they may be combusted at the engine to produce an engine output. The engine output may be utilized to propel the vehicle as indicated by arrow 212 or to recharge energy storage device 250 via motor 220 or generator 260.

In some examples, energy storage device 250 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 250 may include one or more batteries and/or capacitors. In some examples, increasing the electrical energy supplied from the energy storage device 250 may decrease an electric-only operation range, as will be described in greater detail below.

Control system 290 may communicate with one or more of engine 210, motor 220, fuel system 240, energy storage device 250, and generator 260. In some examples, control system 290 may be used similarly to controller 12 of FIG. 1. Control system 290 may receive sensory feedback information from one or more of engine 210, motor 220, fuel system 240, energy storage device 250, and generator 260. Further, control system 290 may send control signals to one or more of engine 210, motor 220, fuel system 240, energy storage device 250, and generator 260 responsive to this sensory feedback. In some examples, control system 290 may receive an indication of an operator requested output of the vehicle propulsion system from a vehicle operator 202. For example, control system 290 may receive sensory feedback from pedal position sensor 294 which communicates with pedal 292. Pedal 292 may refer schematically to a brake pedal and/or an accelerator pedal. Furthermore, in some examples control system 290 may be in communication with a remote engine start receiver 295 (or transceiver) that receives wireless signals 206 from a key fob 204 having a remote start button 205. In other examples (not shown), a remote engine start may be initiated via a cellular telephone, or smartphone based system where a user's cellular telephone sends data to a server and the server communicates with the vehicle to start the engine. In some examples, additionally or alternatively, the vehicle propulsion system 200 may be configured to operate autonomously (e.g., without a human vehicle operator). As such, the control system 290 may determine one or more desired operating engine conditions based on estimated current driving conditions.

Energy storage device 250 may periodically receive electrical energy from a power source 280 residing external to the vehicle (e.g., not part of the vehicle) as indicated by arrow 284. As a non-limiting example, vehicle propulsion system 200 may be configured as a plug-in hybrid electric vehicle (HEV), whereby electrical energy may be supplied to energy storage device 250 from power source 280 via an electrical energy transmission cable 282. During a recharging operation of energy storage device 250 from power source 280, electrical transmission cable 282 may electrically couple energy storage device 250 and power source 280. While the vehicle propulsion system is operated to propel the vehicle, electrical transmission cable 282 may disconnect between power source 280 and energy storage device 250. Control system 290 may identify and/or control the amount of electrical energy stored at the energy storage device, which may be referred to as the state of charge (SOC).

In other examples, electrical transmission cable 282 may be omitted, where electrical energy may be received wirelessly at energy storage device 250 from power source 280. For example, energy storage device 250 may receive electrical energy from power source 280 via one or more of electromagnetic induction, radio waves, and electromagnetic resonance. As such, it should be appreciated that any suitable approach may be used for recharging energy storage device 250 from a power source that does not comprise part of the vehicle. In this way, motor 220 may propel the vehicle by utilizing an energy source other than the fuel utilized by engine 210. Fuel system 240 may periodically receive fuel from a fuel source residing external to the vehicle. As a non-limiting example, vehicle propulsion system 200 may be refueled by receiving fuel via a fuel dispensing device 270 as indicated by arrow 272. In some examples, fuel tank 244 may be configured to store the fuel received from fuel dispensing device 270 until it is supplied to engine 210 for combustion. In some examples, control system 290 may receive an indication of the level of fuel stored at fuel tank 244 via a fuel level sensor. The level of fuel stored at fuel tank 244 (e.g., as identified by the fuel level sensor) may be communicated to the vehicle operator, for example, via a fuel gauge or indication in a vehicle instrument panel 296.

The vehicle propulsion system 200 may also include an ambient temperature/humidity sensor 298, and a roll stability control sensor, such as a lateral and/or longitudinal and/or yaw rate sensor(s) 299. The vehicle instrument panel 296 may include indicator light(s) and/or a text-based display in which messages are displayed to an operator. The vehicle instrument panel 296 may also include various input portions for receiving an operator input, such as buttons, touch screens, voice input/recognition, etc. For example, the vehicle instrument panel 296 may include a refueling button 297 which may be manually actuated or pressed by a vehicle operator to initiate refueling. For example, as described in more detail below, in response to the vehicle operator actuating refueling button 297, a fuel tank in the vehicle may be depressurized so that refueling may be performed.

Control system 290 may be communicatively coupled to other vehicles or infrastructures using appropriate communications technology, as is known in the art. For example, control system 290 may be coupled to other vehicles or infrastructures via a wireless network 231, which may comprise Wi-Fi, Bluetooth, a type of cellular service, a wireless data transfer protocol, and so on. Control system 290 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 290 may be communicatively coupled to other vehicles or infrastructures via a wireless network 231 and the internet (e.g. cloud), as is commonly known in the art. One example of a V2V communication device may include dedicated-short-range-communication (DSRC) network which may allow vehicles within a threshold proximity (e.g., 5,000 feet) to communicate (e.g., transfer information) free of an internet connection.

The wireless network 231 may include one or more of a database and a processor. The database may be configured to store various data provided thereto. The processor may be similar to the control system 290, wherein the processor may include memory with instructions stored thereon that allow the processor to analyze data stored in the database to determine one or more real-world conditions. The processor may then relay the outcomes to the control system 290, which may result in vehicle operating parameters being adjusted. As will be described herein, the outputs sent from the processor to the control system 290 may be used to adjust one or more start/stop parameters, the outputs being based on feedback from a plurality of vehicles and other devices within a geofenced area.

Vehicle propulsion system 200 may also include an onboard navigation system 232 (for example, a Global Positioning System) that an operator of the vehicle may interact with. The navigation system 232 may include one or more location sensors for assisting in estimating vehicle speed, vehicle altitude, vehicle position/location, etc. This information may be used to infer engine operating parameters, such as local barometric pressure. As discussed above, control system 290 may further be configured to receive information via the internet or other communication networks. Information received from the GPS may be cross-referenced to information available via the internet to determine local weather conditions, local vehicle regulations, etc.

In some examples, vehicle propulsion system 200 may include one or more onboard cameras 235. Onboard cameras 235 may communicate photos and/or video images to control system 290, for example. Onboard cameras may in some examples be utilized to record images within a predetermined radius of the vehicle, for example. The onboard cameras 235 may be arranged on an exterior surface of the vehicle so that an area surrounding and/or adjacent to the vehicle may be visualized.

Turning now to FIG. 3, it shows a high-level flow chart illustrating a method 300 for maintaining a customized start/stop event. Instructions for carrying out method 300 and the rest of the methods included herein may be executed by a controller, such as the controller 12 of FIG. 1, based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 300 begins at 302, which includes determining current operating parameters. Current operating parameters may include but are not limited to one or more of a throttle position, a manifold vacuum, an engine speed, an engine temperature, a vehicle speed, and an air/fuel ratio.

The method 300 may proceed to 304, which includes determining if start/stop conditions are met. A controller may determine start/stop conditions are met in response to a brake pedal being depressed or the vehicle being stationary. Start/stop conditions may be met if the brake pedal is depressed, the vehicle is stopped, an engine power output is less than or equal to an idle power output, and the vehicle is not towing, where a combination of sensors may signal to the controller to activate the start/stop. A pedal position sensor may sense a position of the pedal. In some examples, the brake pedal or the parking brake may be used to stop the vehicle for the start/stop. As such, a threshold amount of brake pedal depression may correspond to a brake force capable of stopping a motive force of the vehicle. A speed sensor may sense the vehicle speed decreasing to a stop. An engine speed sensor may sense an engine speed of the engine, which may be used to estimate the engine power output. The vehicle may be determined to be towing in response to feedback from a weight sensor and/or in response to a trailer wire or a trailer cable being coupled to a coupling unit of the vehicle. A global positioning system (GPS) may also be used to predict or determine stop locations that meet start/stop conditions based on data received from other on-road vehicles and/or a cloud. In one example, start/stop conditions may be met if the vehicle is stopped for a threshold stop length and the brake pedal is depressed a threshold amount. The threshold stop length is based on a combination of fuel savings and driver satisfaction. In one example, the combination is based on a fuel savings without decreasing driver satisfaction due to reduction in drivability due to too many start/stops. In one example, the threshold stop length may be a default amount of time set by a vehicle manufacturer, wherein the threshold stop length may be adjusted based on driver behavior and driver customized start/stop settings. The default amount of time may be equal to 2 seconds, or 3 seconds, or 5 seconds, and so on. In some examples, the start/stop conditions may not be met until a delay has elapsed, wherein the delay begins once the vehicle is stopped. The delay may be based on one or more of a vehicle operator customization, average stop length, and the like.

If start/stop conditions are not met, then the method 300 may proceed to 306, which includes maintaining current operating parameters. The start/stop is not executed.

Returning to 304, if start/stop conditions are met, then the method 300 may proceed to 308, which includes determining one or more of a driver behavior at 310, traffic conditions at 312, and a vehicle location at 314.

At 310, driver behavior may be determined via a driving mode selected by a vehicle operator, where the vehicle operator may choose from an aggressive, a default, or an economic mode. Data collected by sensors of the vehicle may be sent to the controller so that the controller may determine an identity of the vehicle operator. The controller may signal start/stop operating parameters based on the driver behavior of the vehicle operator. In one example, a weight sensor located in a driver seat in the vehicle may measure a weight of the vehicle operator. The weight may be used to identify the identity of the vehicle operator, wherein the driver behavior may be associated with the vehicle operator. In one example, additionally or alternatively, the vehicle operator may be identified via a wired or a wireless connection from the vehicle to a mobile device, such as a mobile phone. In one example, additionally or alternatively, the vehicle operator may drive the vehicle at a specific time of day (e.g., 8:00 AM Monday through Friday), which may be learned and the controller may associate times of vehicle use with the identity of the vehicle operator, wherein driver behavior may be associated to the identity.

At 312, traffic conditions may be determined via data received from the network. The network may aggregate vehicle data in a similar location (e.g., within a same geofenced area), determining average speed, frequency of braking, time spent stopped and moving, or other combinations of measurements to determine an average stop duration in the geofenced area. Additionally or alternatively, the vehicle may include proximity sensors which may be used to determine the average stop duration in combination with data received from the network. For example, feedback from the proximity sensor may provide data regarding vehicle movement within a threshold distance of a vehicle while the data from the network may provide data regarding movement of a plurality of vehicles within a location, traffic light information, average speed information, and the like.

At 314, vehicle location may be determined based on feedback from a GPS device. The GPS may provide feedback regarding a current vehicle location. In one example, the vehicle location may be associated with a geofenced area. For example, the geofenced area may include a school, a stadium, a park, a city, a country road, a highway, and the like. In some examples, based on a time of day, driving conditions within the geofenced area may differ. For example, driving in the city at 5:00 PM may correspond to different driving conditions than driving through the city at 1:00 PM.

The method 300 may proceed to 316, which includes determining if vehicle operator start/stop conditions are met. For example, vehicle operator start/stop conditions may be learned during previous drive cycles and may be compared to a current drive cycle. Additionally or alternatively, vehicle operator start/stop conditions may be customized based on one or more inputs, including a request to limit start/stops or to maintain default start/stop conditions set by a vehicle manufacturer. The inputs along with the driver behavior, based on the identity of the vehicle operator or a driver behavior selected by the vehicle operator, may correspond to a specific start/stop routine within a geofenced area comprising customized conditions for executing start/stop. Examples of driving conditions in which the start/stop is compared to vehicle operator requested start/stop conditions are described in greater detail with respect to FIG. 8. In this way, a customized start/stop based on vehicle operator adjusted start/stop settings, driver behavior, and the like may be executed. This may decrease or increase a frequency of start/stop.

If the vehicle operator start/stop conditions are met, then the method 300 may proceed to 318, which includes executing the start/stop. The start/stop may be executed by the controller once the conditions are met, shutting down the engine by deactivating fuel injectors of the engine. The start/stop may be exited and engine combustion may resume following an accelerator pedal being tipped-in. After start/stop executes, method 300 may exit.

If the vehicle operator start/stop conditions are not met, then the method 300 may proceed to 320, which includes not executing the start/stop, after which method 300 may exit.

Turning now to FIG. 4, it shows a method 400 illustrating executing the start/stop in response to entering a geofenced area. The method 400 may be executed in combination with the systems illustrated in FIGS. 1 and 2 in some examples.

The method 400 begins at 402, which includes determining the geofenced area. In one example, the geofenced area may be a perimeter around an area of interest, as described above with respect to method 300 of FIG. 3.

The method 400 may proceed to 404, which includes if start/stop conditions are met based on conditions within the geofenced area, as described above.

If start/stop conditions are not met, then the method 400 may proceed to 406, which includes not executing the start/stop. The method 400 may exit.

If start/stop conditions are met as described above, the method 400 may proceed to 408, which includes executing the start/stop as described above. Executing the start/stop may include one or more of deactivating fuel injectors, deactivating ignition devices, and closing one or more intake and exhaust valves.

The method 400 may proceed to 410, which includes determining if the start/stop duration is greater than a threshold stop length. The threshold stop length may be fixed or dynamic, wherein the threshold stop length may be based on driver behavior and historical data. The threshold stop length may be based on a categorization of the geofenced area, wherein a first geofenced area may be associated with a first threshold stop length greater than a second threshold stop length of a second geofenced area. In one example, the first geofenced area may be a highway and the second geofenced area may be a city. The threshold stop length for start/stop may be higher than a default value of the threshold stop length on a highway or other road free of traffic lights, intersections, or other expected stops. In one example, the threshold stop length for start/stop may be lower than the default value on roads with a greater number of expected stops. As will be described here, expected start/stops may be gathered from a network such that a plurality of vehicles may communicate with the network and provide start/stop data. A timer may be used to measure a duration of the start/stop. In one example, the threshold stop length may be based on an amount of time (e.g., 5 seconds, 10 seconds, and the like) balanced between drivability and fuel economy.

If the start/stop duration is not greater than a threshold stop length (e.g., less than or equal to the threshold stop length), then the method 400 may proceed to 412, which includes indicating the start/stop was not desired. In one example, the vehicle operator may exit the start/stop, via depressing an accelerator pedal and/or releasing the brake pedal, prior to the threshold stop length being reached based on traffic conditions changing, driver behavior, and the like.

The method 400 may proceed to 414, which includes learning the undesired start/stop. In this way, the undesired start/stop is learned and stored in memory. The inputs may include location data from the geofenced area, traffic conditions, time of day, weather, driver behavior, driver identity, and the like, which are stored in a multi-input look-up table in association with the undesired start/stop.

The method 400 may proceed to 416, which includes tallying the undesired start/stops. The controller may sum a number of undesired start/stops with similar inputs. For example, only start/stops within a common geofenced area, within a similar time of day, with similar weather conditions, and traffic conditions may be summed together. For example, an undesired start/stop in the city at 1:00 PM on a weekday may not be summed with an undesired start/stop in the city at 5:00 PM on a weekday.

Returning to 410, if the start/stop duration is greater than the threshold stop length, the method 400 may proceed to 418, which includes confirming start/stop is desired. In one example, the start/stop duration is greater than the threshold stop length, thereby indicating the vehicle operator approval of the start/stop conditions.

The method 400 may proceed to 420, which includes learning the desired start/stop. The controller may associate the combination of location data from the geofenced area, the vehicle operator identity, the time of day, and the like with the data from the desired start/stop.

The method 400 may proceed to 422, which includes tallying the desired start/stops. The controller may sum a number of times start/stop exceeds a threshold time as described above in the geofenced area with similar inputs.

The method 400 may proceed to 424 following each of 416 and 422, which includes determining if the number of desired start/stops in the geofenced area is greater than the number of undesired start/stops in the geofenced area. The controller may reference the sums of desired and undesired start/stops. In one example, the sum of the desired start/stops is directly compared to the sum of the undesired start/stops, and a majority may be used to determine the geofenced area as desired. Additionally or alternatively, a percentage of desired start/stops may be compared to a percentage of undesired start/stops. In one example, the percentage of total start/stops that are desired may be evaluated, and if more than 50% of the start/stops are desired, the geofenced area may be marked as desired. Additionally or alternatively, a sum of greater than 60%, or 70%, or greater, of desired or undesired start/stops may be used to categorize the geofenced area as desired or undesired.

If the number of desired start/stops is greater than the number of undesired start/stops in the geofenced area, the method 400 may proceed to 426, which includes marking the geofenced area as a high frequency start/stop area. The high frequency start/stop area may include a more conservative driving style. As such, stops may be longer, there may be fewer accelerations, and creep may be lower. Calculating a creep score is described with respect to method 700 of FIG. 7. In this way, start/stop parameters may be adjusted to increase the start/stop frequency. Adjusting the parameters may include reducing and/or removing a delay and decreasing the threshold stop length.

If the number of desired start/stops is not greater than the number of undesired start/stops in the geofenced area, the method 400 may proceed to 427, which includes determining if the number of desired start/stops in the geofenced area is less than the number of undesired start/stops in the geofenced area.

If the number of desired start/stops is less than the number of undesired start/stops in the geofenced area, the method 400 may proceed to 428, which includes marking the geofenced area as a low frequency start/stop area. The low frequency start/stop area may include adjustments similar to adjustments executed in response to a more aggressive and/or a sporty driving mode being selected. As such, stops may be shorter, there may be more accelerations, and creep may be higher in the geofenced area. Start/stop parameters may be adjusted to decrease the start/stop frequency. The adjustments may include increasing the delay and/or completely blocking start/stop, and increasing the threshold stop length.

If the number of desired start/stops is not less than the number of undesired start/stops in the geofenced area, the method 400 may proceed to 430, which includes maintaining default frequency start/stop operating parameters in the geofenced area. The default frequency may be a frequency set by a vehicle manufacturer or may be based on a previously determined start/stop frequency within the geofenced area during a previous drive cycle. As such, the delay and the threshold stop length may be maintained as a driver behavior matches an estimated or previously determined desired start/stop frequency.

Turning now to FIG. 5, it shows a method 500 illustrating executing start/stop based on vehicle operator preferences and data received wirelessly from the network. The method 500 may be executed in combination with the systems illustrated in FIGS. 1 and 2 in some examples.

The method 500 begins at 502, which includes determining the geofenced area. The geofenced area may be determined by the GPS device, as described above.

The method 500 may proceed to 504, which includes determining if the vehicle operator start/stop customization settings and/or driver behavior are known. Start/stop customization settings may be based on inputs provided by the vehicle operator via a human-machine interface (HMI). Determining the driver behavior is described above with respect to methods 300 and 400 of FIGS. 3 and 4, respectively.

If the vehicle operator preference and/or driver behavior are known, the method 500 may proceed to 506, which includes executing start/stop based on vehicle operator customization inputs and/or learned driver behavior. Vehicle operator customization inputs are described in the example of FIG. 8.

If the vehicle operator customization settings and/or driver behavior are not known, the method 500 may proceed to 508, which includes requesting vehicle operator start/stop customization inputs. The vehicle operator may specify road types and geofenced areas where they prefer start/stop to not execute. The controller may associate the customization inputs with the vehicle operator such that future start/stop operations in the geofenced area by the vehicle may follow the preferences specific to the vehicle operator identity.

The method 500 may proceed to 510, which includes determining if vehicle operator customization inputs are received. Inputs may be provided by the vehicle operator via the HMI, which may include a navigation system, infotainment system, a mobile device, or the like. The controller may receive the inputs and update start/stop customization settings for a specific vehicle operator (e.g., a specific vehicle operator identity). If vehicle operator customization inputs are received, the method 500 may proceed to 506, which includes executing start/stop based on vehicle operator input and learned driver behavior.

If vehicle operator customization inputs are not received, the method 500 may proceed to 512, which includes executing start/stop based on data wirelessly received from the network. A processor of the network may send data via a communication device (e.g., a modem) to the controller of the vehicle. In one example, the data may include outputs corresponding to start/stop conditions such that a computing power of the controller may be reduced. Additionally or alternatively, the data from the processor may be analyzed by the controller to determine various start/stop conditions. Data may aggregate from multiple surrounding vehicles on the network to generate crowdsourced behaviors to apply to the start/stop operations of the vehicle.

In some examples, additionally or alternatively, a customized start/stop from a different vehicle may be used in response to the customization inputs not being received. In one example, the different vehicle may include one or more similar characteristics to the vehicle operator and/or a vehicle driven by the vehicles operator. The one or more similar characteristics may include but are not limited to location, driver age, sex, home address, vehicle make, vehicle model, vehicle manufacture date, vehicle manufacture location, repair history, accident history, and the like.

The method 500 may proceed to 514, which includes determining one or more of a stop length of nearby vehicles at 516, an estimated traffic light timing at 518, and an estimated traffic flow at 520. The determinants of 514 may have varying weights, depending on factors including but not limited to one or more of the vehicle location, driver behavior, time of day, nearby vehicle operator behavior, historical vehicle operator behavior, and the like.

At 516, the stop length of vehicles within the geofenced area may be sent to the network. The stop length data of the vehicles within the geofenced area may be used to calculate an average stop length within the geofenced area. The average stop length may be calculated via a processor of the network. In one example, the vehicle may be in a drive-through, and the controller may use stop length data to determine that the average stop length in the geofenced area encompassing the drive-through is 60 seconds among the vehicles connected to the network. The stop length data may show that a percentage of vehicles that stop in the geofenced area stop for at least a period of time, where the period of time may be a threshold stop length for the geofenced area, a default value set by the manufacturer, or a customized value set by the vehicle operator.

At 518, the estimated traffic light timing may be determined by the vehicle communicating with a traffic signal and other vehicles at the traffic signal using the controller as described in the description of FIG. 1. Traffic signal phase data and traffic signal phase duration data may be collected from traffic signals connected to the network. In one example, the controller of the vehicle may receive traffic signal data directly from the traffic signal, other vehicles at the traffic signal, and/or from the network, and the data may indicate the traffic signal may signal to stop for greater than the threshold length. As such, a start/stop may be executed at the traffic signal. As another example, the data may indicate that the traffic signal may signal to drive within a time less than the threshold length. In such an example, the start/stop may not be executed. However, if the traffic signal may switch to a drive signal in less than the threshold length, but an estimated duration of a vehicle stop, which is based a number of vehicles stopped at the traffic signal in combination with the traffic signal phase duration, then a start/stop may still be executed. Vehicle data may be used to estimate traffic signal phases and timings as a supplement or substitute to traffic signal data. In one example, the vehicle may be at a traffic signal receiving vehicle data from the network or from vehicles within the geofenced area at the traffic signal, where the vehicle data may be used to determine phase signals and phase signal duration of the traffic signal.

As another example, a number of vehicles stopped ahead of the vehicle may be used to estimate an upcoming stop length. For example, if the signal indicates drive, but the number of vehicles ahead of the vehicle have not initiated motion, then the upcoming stop length may be greater than if motion was initiated in the stopped vehicles of if the number of vehicles was fewer.

At 520, the estimated traffic flow may be based on current traffic flow and historical traffic flow data. Current traffic flow may be based on real-time vehicle data provided to the network, wherein the real-time vehicle data includes an average vehicle speed, an average vehicle stop duration, weather, and the like. Historical traffic flow data may be based on previous vehicle data within the geofenced area stored in a multi-input look-up table, wherein inputs may include weather, time of day, number of vehicles, and the like.

The method 500 may proceed to 522, which includes updating the start/stop routine. Updates to the start/stop routine may include adjusting start/stop entry and/or exit conditions. In one example, the updates may include adjusting the threshold length in response to vehicle operator driver behavior and traffic data. For example, the threshold length may be increased in response to a more aggressive driver behavior and/or traffic data indicating a frequent number of stops. As another example, the updates may include adjusting the threshold length in response to vehicle operator inputs, a selected drive mode, and/or vehicle data pertaining to other vehicles within the geofenced area. In this way, the updates may adjust a start/stop frequency to meet vehicle operator demands.

Turning now to FIG. 6, it shows a method 600 illustrating the execution of start/stop based on conditions that may or may not be met. The method 600 may be executed in combination with the systems illustrated in FIGS. 1 and 2 in some examples.

The method 600 begins at 604, which includes determining if a garage door open request is present. The vehicle operator may use one or more methods and devices to request a garage door open including but not limited to a remote control (e.g., a garage door opener), an application on a mobile phone, connected to a home Wi-Fi, and an application in the vehicle operable via a HMI of the vehicle. The remote control, the mobile phone application, and/or the vehicle application may be paired with the controller and an actuator of the garage door via Bluetooth, Wi-Fi, a short-range communication network, the wireless network, and the like. In one example, the GPS device may determine a vehicle operator is at a driveway of their home or other location where a previous garage door open request has been issued and may request the garage door open without a user input, which may be previously set as a desired setting by the vehicle operator. Additionally or alternatively, proximity sensors and/or environment visualization sensors (e.g., cameras) may be used to determine if a garage door is present within a threshold proximity of the vehicle, such that start/stop operation of the vehicle is modified to accommodate the garage door open request. For example, the threshold proximity may be 100 meters, wherein if the vehicle is outside of the threshold proximity, then the garage door open request may be ignored and the start/stop operation may not be adjusted based on the garage door open request.

If the garage door open request is present, the method 600 may proceed to 606, which includes not executing start/stop. The controller may associate a stop length with the geofenced area (e.g., a driveway or a parking lot) encompassing the garage door such that upon the garage door open request being present, the controller may adjust start/stop operations to block execution of the start/stop. In one example, the vehicle stop length may exceed the stop length during the presence of the garage door opening request, meeting start/stop conditions. However, the start/stop may not be executed to meet a vehicle operator demand. The method 600 may exit.

If the garage door open request is not present, the method 600 may proceed to 608, which includes determining if the vehicle is at a drive-through. The vehicle may be determined to be at the drive-through via the GPS device. In one example, the controller may adjust start/stop parameters of the vehicle based on the geofenced area being a drive-through.

If the vehicle is at the drive-through, the method 600 may proceed to 609, which includes determining if the stop length at the drive-through is greater than the threshold stop length. A categorization of the drive-through, determined via feedback from the GPS device and/or other vehicles, may be used to adjust the threshold stop length and other start/stop operating parameters. As one real-world example, if the drive-through is a pharmacy drive-through, then the threshold stop length may be adjusted to a lower threshold stop length to increase a start/stop frequency and decrease fuel consumption. Additionally or alternatively, if the drive-through is a restaurant drive-through, the threshold stop length may be adjusted to a higher threshold stop length to decrease start/stop frequency due to increased stop and go activity. In one example, a microphone, a parking gear, a mobile device, and the like may be used to adjust the threshold stop length at the drive-through. In one example, the microphone in the vehicle may receive voice activity, only with allowed permissions from the vehicle operator, when the vehicle operator is placing an order at the drive-through, and the voice activity may result in an increase or a decrease to the threshold stop length depending on the contents of the placed order. In another example, an order of 5 or more items may decrease the threshold stop length to increase a likelihood of start/stop execution and an order of less than 5 items may increase the threshold stop length to decrease a likelihood of start/stop execution. In one example, the vehicle operator may engage the park gear while at the drive-through, wherein engagement of the park gear may result in a reduced threshold stop length. In one example, a start/stop may be executed in response to the park gear being engaged in conjunction with an absence of a vehicle operator engine off request. Additionally or alternatively, a number of vehicles ahead of the vehicle in the drive-through may adjust the threshold stop length, wherein as the number of vehicles increases, the threshold stop length decreases.

In some examples, additionally or alternatively, drive-throughs may include curbside parking. Examples of curbside parking may include ride sharing services where a vehicle operator is parked along a curb.

If the stop length at the drive-through is not greater than the threshold stop length, the method 600 may proceed to 606, which includes not executing start/stop. As such, the engine may continue to combust fuel.

If the stop length at the drive-through is greater than the threshold stop length, the method 600 may proceed to 610, which includes executing low-frequency start/stop. Low-frequency start/stop operating parameters may include increasing the threshold stop length to decrease the frequency of start/stop executions. Low-frequency start/stop operating parameters may consider the increased depression of the brake pedal compared to the threshold depression for default mode start/stop, the engine power output, and the adjusted threshold stop length as the primary conditions to execute low-frequency mode start/stop.

Returning to 608, if the vehicle is not at the drive-through, the method 600 may proceed to 612, which includes determining if default mode start/stop conditions are met. Default start/stop conditions may be met if the brake pedal is depressed, the vehicle is stopped, the engine power output is less than or equal to an idle power output, and the vehicle is not towing, where a combination of sensors may signal to the controller to activate the start/stop if the conditions are met.

If default mode start/stop conditions are met, the method 600 may proceed to 616, which includes executing default mode start/stop with a default start/stop frequency, wherein the default frequency is greater than the low-frequency.

If default mode start/stop conditions are not met, the method 600 may proceed to 614, which includes determining if economic mode start/stop conditions are met. Economic start/stop conditions may be met if the brake pedal is depressed less than the threshold amount of default mode start/stop, the vehicle is stopped for a time less than the threshold stop length of default mode start/stop, and the engine power output is less than or equal to idle power output. A vehicle operator may choose economic mode start/stop, valuing fuel economy over driver experience.

If economic mode start/stop conditions are met, the method 600 may proceed to 618, which includes executing economic start/stop with a higher frequency of start/stops than the default and low-frequency modes. Economic start/stop may increase the frequency of start/stop executions to increase the fuel economy of the vehicle by reducing and/or removing the delay prior to executing start/stop and reducing the threshold stop length so that a greater number of stops may meet start/stop conditions.

If economic mode start/stop conditions are not met, the method 600 may proceed to 610, which includes executing low-frequency start/stop mode.

Turning now to FIG. 7, it shows a method 700 for determining a driver creep score. The driver creep score may be a quantitative representation of a tendency the vehicle operator has to creep the vehicle forward. Creep herein may be defined as a vehicle moving in a forward direction while a stop condition is met. The stop condition may include where a different vehicle directly ahead of the vehicle is stopped, a traffic light directly ahead of the vehicle indicates to stop, a pedestrian directly ahead of the vehicle is crossing a cross-walk, etc. Said another way, a tendency to creep may include where a vehicle operator propels the vehicle despite a stop condition being met. As such, the tendency may increase as a creep tally increases, wherein a creep tally may be tabulated for a variety of driving conditions. In some examples, vehicle data, such as an ignition state, an accelerator pedal position, and a vehicle speed may be used to determine creep score. One or more weights may be applied to the tallies to modify values thereof to more accurately determine the creep score.

The method 700 begins at 702, which includes determining a vehicle condition. The vehicle condition may include one or more of the location of the vehicle and the current start/stop mode. The location may be determined by the GPS device and current start/stop mode may be determined as described above with respect to method 600 of FIG. 6. The vehicle condition may further include weather, time of day, vehicle operator identity including sex and age, and the like.

The method 700 may proceed to 704, which includes determining a first score. The first score may be determined via equation 1 below.

$$\frac{W_1(\text{number of times stopped for} < X \text{ seconds})}{\text{total number of stops}} \quad \text{(equation 1)}$$

The value X seconds may be equal to the threshold stop length described above. As such, the value X may be a dynamic value based on driving conditions within a geofenced area. In one example, the total number of stops may include only stops where a stop condition is met for greater than or equal to X seconds. That is to say, the total number of stops may only include stops where start/stop conditions are met. In this way, the first score may estimate a number of stop conditions in which start/stop conditions are not met. $W_1$ may be a first weight, wherein the first weight may be modified based on driver behavior, location, time of day, weather, and the like. For example, the first weight may be reduced in response to a vehicle operator tendency to coast toward a stop condition as coasting may also resulting in a fuel savings despite possibly resulting in a stop condition for less than X seconds when a start/stop condition may have been met. Alternatively, the first weight may be increased in response to a vehicle operator using launch control at a stop or switching lanes to delay a stop.

The method 700 may proceed to 706, which includes determining a second score. The second score may be determined via equation 2 below.

$$\frac{W_2(\text{motion initiated with distance } < k \text{ meters})}{\text{total number of times motion is initiated}} \quad \text{(equation 2)}$$

K meters may correspond to an average stop distance between the vehicle and one or more of a vehicle directly ahead, a stop sign, an intersection, a pedestrian, and the like. The average stop distance may be determined over time based on a plurality of initial stop distances set by the vehicle operator. As such, the average stop distance may not factor subsequent stop distances due to creep. As another example, the average stop distance may be based on initial stop distances set by a plurality of vehicles within a geofenced area. As such, if the vehicle operator stops with an initial stop distance greater than K meters and moves the vehicle forward with a stop distance still greater than K meters, then the instance of motion may not be included in equation 2. $W_2$, which corresponds to a weight of equation 2, may be adjusted in response to driver behavior, location, time of day, weather, and the like. For example, if motion is initiated due to another vehicle requesting a lane change into a lane of the vehicle operator, then $W_2$ may be reduced. As another example, $W_2$ may be increased in response to motion being initiated and the vehicle directly ahead remaining stationary. As a further example, $W_2$ may be decreased in response to motion being initiated in combination with the vehicle directly ahead moving.

The method 700 may proceed to 708, which includes determining a third score. The third score may be determined via equation 3 below.

$$W_3(\text{number of times acceleration changes while vehicle speed} < h_1) \quad \text{(equation 3)}$$

A threshold vehicle speed $h_1$ may correspond to one or more of a speed limit, an average vehicle speed of the vehicle, and an average vehicle speed of a plurality of similar vehicles within a geofenced area. In one example, the number of times an acceleration changes while the vehicle remains below the threshold vehicle speed $h_1$ may correspond to a vehicle operator aggression, wherein a higher number of times may correspond to an aggressive driver behavior and a lower number of times may correspond to a conservative driver behavior. In one example, the third weight, $W_3$ may be adjusted in response to the threshold vehicle speed $h_1$. For example, the third weight, $W_3$ may be increased in response to the threshold vehicle speed $h_1$ decreasing. As another example, $W_3$ may be decreased in response to the threshold vehicle speed $h_1$ increases. Thus, more aggressive driver behavior may correspond to acceleration changes occurring during lower threshold vehicle speeds, which may be accordingly factored into the third score to determine the creep score.

The method 700 may proceed to 710, which includes determining a fourth score. The fourth score may be determined via equation 4 below.

$$\frac{W_4\left(\begin{array}{c}\text{number of time acceleration is greater}\\ \text{than } b \text{ and speed is less than } h_2\end{array}\right)}{\text{number of acceleration events when speed is less than } h_2} \quad \text{(equation 4)}$$

A threshold vehicle speed $h_2$ may correspond to one or more of a speed limit, an average speed of the vehicle, and an average vehicle speed of the plurality of similar vehicles within the geofenced area. In one example, the threshold vehicle speed $h_2$ may be greater than or less than the threshold vehicle speed $h_1$. Additionally or alternatively, the threshold vehicle speed $h_2$ may be identical to the threshold vehicle speed $h_1$. The fourth weight, $W_4$, may be adjusted in response to the threshold vehicle speed $h_2$. For example, the fourth weight, $W_4$, may be increased in response to the threshold vehicle speed $h_2$ decreasing. As another example, the fourth weight, $W_4$, may be decreased in response to the threshold vehicle speed $h_2$ increasing.

In one example, some instances of extreme weather, such as snow or ice being present of a driving surface, may adjust one or more of the first through fourth weights. In one example, the weights would decrease in response to the extreme weather. As another example, the weights may remain constant. As another example, road topography, such as a hill, may be used to adjust the weights. For example, if the vehicle is on a hill with ice or snow, then one or more of the weights may be adjusted to zero to negate confusion between creep and the vehicle operator maintaining a current position to prevent sliding.

The method 700 may proceed to 712, which includes summing the first, second, third, and fourth scores. In one example, the scores may be transferred to the network in real-time, wherein the network may sum the scores via a processor thereof. Additionally or alternatively, the scores may be tracked on the controller of the vehicle, wherein the controller may sum the scores. The method 700 may proceed to 714, which includes determining the driver creep score during the vehicle condition. In one example, the higher the driver creep score, then a probability of the vehicle operator creeping during the vehicle condition is higher compared to a lower driver creep score. In one example, the driver creep score may be included in a learned driver behavior associated with a vehicle operator identity.

The method 700 may proceed to 716, which includes adjusting start/stop parameters during the vehicle condition. For example, if the driver creep score is relatively high, then the start/stop parameters may be adjusted to decrease a frequency of start/stop. This may result in a fuel savings relative to executing start/stops interrupted by driver creep. In one example, decreasing the frequency of start/stop may include increasing a duration of a delay following a vehicle stop prior to executing the start/stop.

Turning now to FIG. 8, it illustrates an embodiment 800 of a display 810. The display 810 may be an infotainment system, a mobile device, or other HMI device configured to receive inputs from the vehicle operator. The display 810 may include a graphical user interface (GUI) or human machine interface (HMI) with touch screen or physical button functionality that allows the vehicle operator to customize one or more start/stop conditions, wherein the customization may be sent to the controller of the vehicle. In some examples, additionally or alternatively, an application on a mobile phone connected to the vehicle may be used by the vehicle operator to customize start/stop conditions.

The display 810 illustrates a plurality of customizable options for the vehicle operator to customize. For example, the display 810 illustrates a highway driving condition 812 with an adjustable slider 814 for the vehicle operator to customize a start/stop frequency during the highway driving conditions 812. As illustrated, the adjustable slider 814 may be adjusted from a first extreme end where the frequency is low to a second extreme end where the frequency is high. The slider may be further adjusted to any position between the first and second extreme ends. By adjusting the slider to or between the first and second extreme ends, the vehicle operator may customize start/stop parameters specifically for highway driving conditions. For example, if the vehicle operator adjusts the slider to low, then the start/stop operating parameters may be adjusted to increase a delay that blocks start/stop even when start/stop conditions are met.

The vehicle operator may further customize start/stop parameters for city conditions 816 via adjustable slider 818, home conditions 820 via adjustable slider 822, work conditions 824 via adjustable slider 826, parking lot condition 828 via adjustable slider 830, drive-through conditions 832 via adjustable slider 834, heavy traffic congestion conditions 836 via adjustable slider 838, average stop length being less than X seconds conditions 840 via adjustable slider 842, extreme weather conditions 84 via adjustable slider 846, time of day conditions 848 via adjustable slider 850, dependent driving conditions 852 via adjustable slider 854, and speed limit being greater than Y conditions via adjustable slider 858.

While the example of FIG. 8 illustrates the plurality of customizable conditions being displayed on a single screen, it will be appreciated that in some conditions the customizable conditions may be displayed separately with more options for fine-tuning one or more start/stop parameters. For example, high conditions 812 may appear on the display 810 with a variety of sub-conditions including average vehicle stop length, weather, average vehicle speed, and the like.

As one example, the home conditions 820 may include where a vehicle is traveling toward home, which may be determined based on one or more of feedback from the GPS device, the time of day, feedback from the mobile device, and the like. Thus, if the vehicle operator is travelling toward home, they may customize start/stop conditions to more or less frequent start/stop conditions. Additionally or alternatively, home conditions 820 may further include the start/stop frequency in response to a garage door open request.

As another example, the work conditions 824 may include where the vehicle is traveling toward work. In some examples, the vehicle operator may request fewer start/stops to work and more start/stops traveling toward home.

The average stop length being less than X seconds conditions 840 may include where an average stop length based on a plurality of vehicles within a geofenced area is less than the threshold stop length (X seconds). Thus, if vehicle stops are less than the threshold stop length, then start/stop parameters may be adjusted based on the vehicle operator customization via the adjustable slider 842.

The speed limit being greater than Y condition 856 may include where the vehicle operator may set a value for Y (e.g., 55 miles per hour) and then may customize a desired start/stop frequency based on the value. For example, the vehicle operator may customize condition 856 to decrease a start/stop frequency for speeds greater than Y. Another customizable condition may further allow the vehicle operator to customize start/stop frequencies at other speed limits.

Referring now to FIG. 9, a graph 900 is shown, which is an example sequence for start/stop execution changing frequency in response to conditions. The sequence of FIG. 9 may be provided by the system of FIGS. 1, 2, and 8 in cooperation with the methods of FIGS. 3-7. Time increases along an abscissa from left to right of FIG. 9. Vertical markers at times t1-t4 represent times of interest during the sequence. All of the plots occur at a same time.

Plot 910 illustrates if a first condition is met. Plot 920 illustrates a second condition is met. Plot 930 illustrates a third condition is met. Plot 940 illustrates a detection of local provided inputs for start/stop, such as customization from a vehicle operator interacting with a display 810 of FIG. 8 or inputs from learned driver behavior described above with respect to methods of FIGS. 3-7. Plot 950 illustrates a frequency of start/stop executions. Plot 960 illustrates if network start/stop data is being received. Time increases along an abscissa from a left to a right side of the figure.

Prior to t1, the first condition is met (plot 910). Therefore, the second condition (plot 920) and the third condition (plot 930) are not met. Local inputs based on a vehicle operator customization are used (plot 940) during the first condition to determine a desired start/stop frequency. The start/stop frequency may be relatively high (plot 950). No cloud start/stop data is used (plot 960) due to the vehicle operator inputs already being known. In one example, the first condition is a geofenced area encompassing a city. The relatively high start/stop frequency during the first condition may be chosen by the vehicle operator via inputs provided through a display of the vehicle and/or during a learned driver behavior. At any rate, the desired start/stop frequency of the vehicle operator is relatively high when the first condition is met, resulting in a delay between a stop and initiation of start/stop being reduced.

At t1, the first condition is no longer met and the second condition is met. Between t1 and t2, vehicle operator inputs are used as a desired vehicle operator start/stop frequency is already known. Thus, network start/stop data is not used, so the frequency may be determined via only the vehicle operator inputs provided. The start/stop frequency during the second condition is lower than the start/stop frequency during the first condition. Adjustments to operation may include increasing the delay between the stop and initiation of start/stop being increased to execute start/stop less frequently when the second condition is met. In one example, the second condition includes highway driving. However, the second condition may be other real-world driving conditions. At t2, the third condition is met. Thus, the second condition is no longer met. Vehicle operator inputs for customizing a desired start/stop frequency are not provided for the third condition. As such, network start/stop data is used, and user data is not (due to an absence thereof), to estimate a desired start/stop frequency. In one example, network data may include an average of desired start/stop frequencies from vehicles similar to the vehicle of the vehicle operator. In one example, vehicle similarity may be based on a make, a model, an engine, a transmission, a manufacture data, a manufacture location, and a repair history, and wherein the vehicle operator and the different vehicle operator comprise one or more similarities including age, sex, driver behavior, and home location.

Between t2 and t3, the start/stop frequency is relatively low. Thus, a delay between the stop and the start/stop being initiated may be further increased during the third condition relative to the second condition. In one example, the third condition may be a condition in which the vehicle operator has not driven with the vehicle. For example, the third condition may include snow or other extreme weather, a fire road, a sand/gravel surface, a stadium, or the like. During the third condition, the start/stop frequency may fluctuate to a greater magnitude than during the first and second conditions. This may be due to the desired start/stop frequency being learned. The start/stop frequency is then adjusted based on learned desired and undesired start/stops during the third condition. Due to limited data provided by the vehicle operator and data provided by the vehicle operator being weighted more heavily than the network data, the greater magnitude of fluctuations may represent the estimated start/stop being calibrated to match a desired start/stop.

At t3, the third condition is no longer met. Between t3 and t4, a plurality of drive cycles occurs over a threshold amount of time (e.g., weeks, months, a year or more, etc.). At t4, the third condition is met. After t4, the network start/stop data is not used since a vehicle operator customized start/stop frequency is already learned. As such, vehicle operator inputs may be used to set the desired start/stop frequency. As illustrated, the desired start/stop frequency after t4 is higher than the estimated start/stop frequency between t2 and t3. In one example, similar vehicles used to estimate start/stop frequency during other conditions in which the vehicle operator customized start/stop frequency is not available may be updated.

In this way, a start/stop frequency may be adjusted based on one or more of a vehicle operator customization, driver behavior, and feedback from a network. The network feedback may include other vehicle operator customizations, driver behaviors, and/or driving parameters, such as stop length, distance to stop, and the like. The technical effect of utilizing network data in combination with vehicle operator customizations is to tailor start/stop parameters to current driving conditions along with vehicle operator requests to enhance start/stop operation, which may result in an increase in fuel efficiency.

FIGS. 1 and 2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

An embodiment of a method comprises displaying a first driving condition and a second driving condition, updating start/stop parameters based on a vehicle operator customization, and adjusting start/stop parameters in response to the first driving condition or the second driving condition being met. A first example of the method further includes where the displaying includes displaying the plurality of driving conditions on a human-machine interface. A second example of the method, optionally including the first example, further includes where the first driving condition and the second driving condition are different and correspond to one or more of a geofenced area, a time of day, weather, a vehicle speed, and traffic. A third example of the method, optionally including one or more of the previous examples, further includes updating based on the vehicle operator customization includes updating based on inputs received through a graphic user interface, wherein the inputs correspond to a desired frequency of start/stop. A fourth example of the method, optionally including one or more of the previous examples, further includes where adjusting further includes reducing a frequency of start/stop, wherein reducing the frequency of start/stop comprises increasing a delay following a vehicle stop prior to initiating start/stop. A fifth example of the method, optionally including one or more of the previous examples, further includes blocking a start/stop in response to a garage door open request. A sixth example of the method, optionally including one or more of the previous examples, further includes blocking a start/stop in response to a vehicle being in a drive-through.

An embodiment of an engine system of a vehicle, comprises a start/stop feature, a display device, and a controller comprising computer-readable instructions stored on non-transitory memory thereof that when executed enable the controller to display a first driving condition and a second driving condition on the display device, update start/stop parameters based on a vehicle operator customization determined via inputs provided via the display device, and adjust start/stop parameters in response to the first driving condition or the second driving condition being met. A first example of the engine system further includes where the vehicle operator customization further includes inputs provided through brake pedal and accelerator pedal actuation. A second example of the engine system, optionally including the first example, further includes where the instructions further enable the controller to increase a delay when the second condition is met following a vehicle stop to decrease a frequency of start/stops in response to the vehicle operator customization signaling a request to decrease the frequency of start/stops during the first condition.

A third example of the engine system, optionally including one or more of the previous examples, further includes where the instructions further enable the controller to receive data from a network corresponding to a start/stop frequency of other vehicles within a same geofenced area as the vehicle, wherein the instructions further enable the controller to adjust a start/stop frequency to a frequency based on data from the network in response to a third condition being met and the vehicle operator customization not being available. A fourth example of the engine system, optionally including one or more of the previous examples, further includes where the instructions further enable the controller to block a start/stop in response to a garage door open request being present and a garage door being within a threshold proximity to the vehicle during a vehicle stop. A fifth example of the engine system, optionally including one or more of the previous examples, further includes where the instructions further enable the controller to block a start/stop in response to a vehicle driving through a drive-through. A sixth example of the engine system, optionally including one or more of the previous examples, further includes where wherein the instructions further enable the controller to receive customized start/stop conditions from a different vehicle with a different vehicle operator in response to the vehicle operator customization being absent, wherein the different vehicle communicates with the vehicle via a vehicle to vehicle communication network. A seventh example of the engine system, optionally including one or more of the previous examples, further includes where the vehicle and the different vehicle comprise one or more similarities including a make, a model, an engine, a transmission, a manufacture data, a manufacture location, and a repair history, and wherein the vehicle operator and the different vehicle operator comprise one or more similarities including age, sex, driver behavior, and home location.

An embodiment of a hybrid vehicle, comprises an engine, a start/stop feature, and a controller comprising computer-readable instructions stored on non-transitory memory thereof that when executed enable the controller to adjust start/stop conditions in response to a vehicle operator providing a customized desired start/stop frequency, and block a start/stop in response to a garage door open request being present and a garage door being within a threshold proximity of the hybrid vehicle during a vehicle stop. A first example of the hybrid vehicle further includes where the instructions further enable the controller to adjust start/stop conditions in response to feedback from a wireless network, wherein the wireless network is in communication with a plurality of vehicles within a geofenced area. A second example of the hybrid vehicle, optionally including the first example, further includes where instructions further enable the controller to adjust start/stop conditions in response to an average stop duration of the plurality of vehicles within the geofenced area, wherein start/stop conditions are adjusted to decrease a frequency of start/stop in response to the average stop duration decreasing and to increase the frequency of start/stop in response to the average stop duration increasing. A third example of the hybrid vehicle, optionally including one or more of the previous example, further includes where a processor of the wireless network groups the plurality of vehicles based on characteristics of a vehicle operator or a vehicle including one or more of an age, a sex, a driver behavior, a make, a model, and a creep score. A fourth example of the hybrid vehicle, optionally including one or more of the previous example, further includes where the creep score is determined by tracking a plurality of conditions including a number of times the vehicle is stopped for less than a threshold length, a number of times motion is initiated from a stop in combination with a distance between the vehicle and a vehicle directly ahead, a number of acceleration changes, and a number of acceleration change with a magnitude greater than a threshold magnitude for a threshold speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A engine system of a vehicle, comprising:
a start/stop feature;
a display device; and a controller comprising computer-readable instructions stored on non-transitory memory thereof that when executed enable the controller to:
  display a first driving condition and a second driving condition on the display device;
  update start/stop parameters based on a vehicle operator customization determined via inputs provided via the display device; and
  adjust start/stop parameters in response to the first driving condition or the second driving condition being met, wherein the instructions further enable the controller to receive data from a network corresponding to a start/stop frequency and a creep score of other vehicles within a same geofenced area as the vehicle, the creep score being a quantitative representation of a tendency the vehicle operator has to creep the vehicle forward, wherein creep is defined as a vehicle moving in a forward direction while a stop condition is met.

2. The engine system of claim 1, wherein the vehicle operator customization further includes inputs provided through brake pedal and accelerator pedal actuation.

3. The engine system of claim 1, wherein the instructions further enable the controller to increase a delay when the second condition is met following a vehicle stop to decrease a frequency of start/stops in response to the vehicle operator customization signaling a request to decrease the frequency of start/stops during the first condition.

4. The engine system of claim 1, wherein the instructions further enable the controller to adjust a start/stop frequency to a frequency based on data from the network in response to a third condition being met and the vehicle operator customization not being available.

5. The engine system of claim 1, wherein the instructions further enable the controller to block a start/stop in response to a garage door open request being present and a garage door being within a threshold proximity to the vehicle during a vehicle stop.

6. The engine system of claim 1, wherein the instructions further enable the controller to block a start/stop in response to a vehicle driving through a drive-through.

7. The engine system of claim 1, wherein the instructions further enable the controller to receive customized start/stop conditions from a different vehicle with a different vehicle operator in response to the vehicle operator customization being absent, wherein the different vehicle communicates with the vehicle via a vehicle to vehicle communication network.

8. The engine system of claim 7, wherein the vehicle and the different vehicle comprise one or more similarities including a make, a model, an engine, a transmission, a manufacture data, a manufacture location, and a repair history, and wherein the vehicle operator and the different vehicle operator comprise one or more similarities including age, sex, driver behavior, and home location.

9. A hybrid vehicle, comprising:
  an engine;
  a start/stop feature; and
  a controller comprising computer-readable instructions stored on non-transitory memory thereof that when executed enable the controller to:
    adjust start/stop conditions in response to a vehicle operator providing a customized desired start/stop frequency; and
    block a start/stop in response to a garage door open request being present and a garage door being within a threshold proximity of the hybrid vehicle during a vehicle stop, wherein the instructions further enable the controller to adjust start/stop conditions in response to feedback from a wireless network, wherein the wireless network is in communication with a plurality of vehicles grouped based on a creep score of each vehicle, the creep score being a quantitative representation of a tendency the vehicle operator has to creep the vehicle forward, wherein creep is defined as a vehicle moving in a forward direction while a stop condition is met.

10. The hybrid vehicle of claim 9, wherein the plurality of vehicles are a plurality of vehicles determined to be within a geofenced area.

11. The hybrid vehicle of claim 10, wherein instructions further enable the controller to adjust start/stop conditions in response to an average stop duration of the plurality of vehicles within the geofenced area, wherein start/stop conditions are adjusted to decrease a frequency of start/stop in response to the average stop duration decreasing and to increase the frequency of start/stop in response to the average stop duration increasing.

12. The hybrid vehicle of claim 11, further comprising where a processor of the wireless network groups the plurality of vehicles based on characteristics of a vehicle operator or a vehicle including one or more of an age, a sex, a driver behavior, a make, and a model.

13. The hybrid vehicle of claim 9, wherein the creep score is determined by tracking a plurality of conditions including a number of times the vehicle is stopped for less than a threshold length, a number of times motion is initiated from a stop in combination with a distance between the vehicle and a vehicle directly ahead, a number of acceleration changes, and a number of acceleration change with a magnitude greater than a threshold magnitude for a threshold speed.

14. A hybrid vehicle, comprising:
  an engine;
  a start/stop feature; and
  a controller comprising computer-readable instructions stored on non-transitory memory thereof that when executed enable the controller to:
    adjust start/stop conditions in response to a vehicle operator providing a customized desired start/stop frequency; and
    block a start/stop in response to a garage door open request being present and a garage door being within a threshold proximity of the hybrid vehicle during a vehicle stop, wherein the instructions further enable the controller to adjust start/stop conditions in response to feedback from a wireless network, wherein the wireless network is in communication with a plurality of vehicles within a geofenced area, wherein instructions further enable the controller to adjust start/stop conditions in response to an average stop duration of the plurality of vehicles within the geofenced area, wherein start/stop conditions are adjusted to decrease a frequency of start/stop in response to the average stop duration decreasing and to increase the frequency of start/stop in response to the average stop duration increasing, where a processor of the wireless network groups the plurality of vehicles based on characteristics of a vehicle operator or a vehicle including one or more of an age, a sex, a driver behavior, a make, a model, and a creep score, wherein the creep score is determined by tracking a plurality of conditions including a number of times the vehicle is stopped for less than a threshold length, a number of times motion is initiated from a stop in combination with a distance between the vehicle and a vehicle directly ahead, a number of acceleration changes, and a number of acceleration change with a magnitude greater than a threshold magnitude for a threshold speed.

\* \* \* \* \*